(12) United States Patent
Cook et al.

(10) Patent No.: US 6,369,183 B1
(45) Date of Patent: Apr. 9, 2002

(54) METHODS AND MATERIALS FOR FABRICATION OF ALUMOXANE POLYMERS

(75) Inventors: Ronald Lee Cook, Lakewood, CO (US); Andrew Ross Barron, Houston, TX (US); Kevin Joseph Gleason, Lafayette, CO (US); David Brent MacQueen, Golden, CO (US); Georgette Laila Siparsky, Denver, CO (US); Yoshihiro Koide, Saitama (JP); Cullen Taylor Vogelson, Houston, TX (US)

(73) Assignee: Wm. Marsh Rice University, Houston, TX (US)

( * ) Notice: Subject to any disclaimer, the term of this patent is extended or adjusted under 35 U.S.C. 154(b) by 0 days.

(21) Appl. No.: 09/133,642

(22) Filed: Aug. 13, 1998

(51) Int. Cl.[7] .............................. C08G 79/10; C08F 8/00

(52) U.S. Cl. ................... 528/10; 525/326.1; 525/330.6; 525/370; 525/400; 525/408; 525/397; 525/418; 525/454; 525/475; 525/508; 525/519; 525/533; 525/535; 528/55; 528/87; 528/230; 528/271; 528/395; 528/485; 528/44; 528/106; 528/129; 528/166; 528/10

(58) Field of Search .......................... 525/326.1, 330.6, 525/370, 400, 408, 397, 418, 454, 475, 508, 519, 533, 535; 528/10, 55, 87, 230, 271, 395, 485, 44, 106, 129, 166

(56) References Cited

U.S. PATENT DOCUMENTS

| | | | |
|---|---|---|---|
| 4,496,714 A | 1/1985 | Murata et al. | 528/272 |
| 4,676,928 A | 6/1987 | Leach et al. | 252/313.1 |
| 4,952,634 A | 8/1990 | Grossman | 525/190 |
| 5,212,261 A | 5/1993 | Stierman | 525/506 |
| 5,418,298 A | 5/1995 | Laine et al. | 525/389 |
| 5,593,781 A | 1/1997 | Nass et al. | 428/403 |

FOREIGN PATENT DOCUMENTS

WO 9723288 3/1997

OTHER PUBLICATIONS

C. T. Vogelson, Y. Koide, S.G. Bott, and A.R. Barron, "Inorganic–organic hybrid and composite materials using carboxylate–alumoxanes", Barron, 9th CIMTEC–World Ceramics Congress, Ceramics Getting into the 2000–Part C, 499 (1999).

H. Schmidt and H. Krug, "Sol–gel–based inorganic–organic composite materials", ACS Symp. Se. 572, No. Inorganic and Organometallic Polymers II, 183–194, (1994).

Y. Kimura, S. Tanimoto, H. Yamane, T. Kitao, "Coordination Structure of the Aluminium Atoms of Poly (Methylaloxane), Poly (Isopropoxylaloxane) and Poly [Acyloxy) Aloxane]", Polyhedron, vol. 9, No. 2/3, 371–376, (1990).

J.M.G. Cowie, "Polymers: chemistry and physics of modern material," Intertext Books, Aylesbury (1973).

R. S. Bauer, Epoxy Resins, American Chemical Society, 1985, ACS Symp. Ser, 285, pp. 931–961.

Christopher C. Landry, et al., From Minerals to Materials: Synthesis of Alumoxanes from the Reaction of Boehmite with Carboxylic Acids, 1995 J. Mater. Chem 5(2) pp 331–341.

S. Pasynkiewicz, Alumoxanes: Synthesis, Structures, Complexes and Reactions, Polyhedron, vol. 9, No. 2/3, 1990 pp. 429–453.

Harry S. Katz, et al. Handbook of Fillers and Reinforcements for Plastics, Van Nostrand Reinhold Company, 1978 pp. 11–58.

Malcolm P. Stevens, Polymer Chemistry, An Introduction, Oxford University Press, 1990 pp 374–379.

Jacqueline I. Kroschwitz, et al., Encyclopedia of Polymer Science and Engineering, vol. 6, Emulsion Polymerization to Fibers, Manufacture, A Wiley–Interscience Publication, 1985, pp 322–382.

Bryan Ellis, Chemistry and Technology of Epoxy Resins, Blackie Academic & Professional, an Imprint of Chapman & Hall, Chapters 1,2,4 & 7, 1993.

R. Kasemann, H. Schmidt; Coatings for Mechanical and Chemical Protection based on Organic–Inorganic Sol–Gel Nanocomposites; New Journal of Chemistry, (1994) (pp. 1117–1123) vol. 18, No. 10.

K. Nakamae, et al.; Studies on Mechanical Properties of Polymer Comnposites by X–Ray diffraction: 3. Mechanism of Stress Transmission in Particulate Epoxy Composite by X–Ray Diffraction; Polymer, 1992, vol. 33, No. 13; (pp. 2720–2724).

H. Jullien, et al. The Microwave Reaction of Phenyl Glycidyl Ether with Aniline on Inorganic Supports: a Model for the Microwave Crosslinking of Epoxy Resins; Polymer, vol. 37, No. 15; 1996; (pp. 3319–3330).

H. Schmidt, et al; Chemistry and Applications of Inorganic–Organic Polymers; Mat. Res. Soc.–Symp. Prac. vol. 73; 1986; (pp. 739–750).

H. Schmidt, et al; Chapter 26, Inorganic–Organic Hybrid Coatings for Metal and Glass Surfaces; American Chemical Society 1995; (pp. 331–347).

(List continued on next page.)

Primary Examiner—David W. Wu
Assistant Examiner—R. Rabago
(74) Attorney, Agent, or Firm—Conley, Rose & Tayon, P.C.

(57) ABSTRACT

A composition of matter, comprising: a chemically functionalized carboxylate-alumoxane that is functionalized with a chemically reactive substituent, and a reactive compound, wherein the chemically reactive substituent reacts with the reactive compound so as to link the carboxylate-alumoxane to the reactive compound and form a polymer matrix. The functional groups on the carboxylate-alumoxane can vary depending on the desired properties of the matrix. Also, the composition of matter may comprise a cross-linked matrix in which the cross-linked components consist of functionalized alumoxanes.

38 Claims, 21 Drawing Sheets

OTHER PUBLICATIONS

J. deWit, et al; *Evaluation of Coatings—A Total System Approach*; Materials Science Forum, vol. 247 (1997) (pp. 69–82).

A. Apblett, et al; Synthesis and Characterization of Triethylsiloxy–Suybstituted Alumoxanes: Their Structural Relationship to the Minerals Boehmite and Diaspore; American Chemical Society; 1992; (pp. 167–181).

Y. Koide, et al; [$Al_5(Bu)_5(\mu_3-O)_2((\mu-OH)_2(\mu-O_2CPh)_2$]: A Model for the Interaction of Carboxylic Acids with Boehmite; 1995; (pp. 4025–4029) Organometallics (14).

Y. Koide, et al; Alumoxanes as Cocatalysts in the Palladium–Catalyzed Copolymerization of Carbon Monoxide and Ethylene: Genesis of a Structure–Activity Relationship; Organometallics, vol. 15, No. 9. (pp. 2213–2226).

A. MacInnes, et al; Chemical Vapor Deposition of Gallium Sulfide: Phase Control by Molecular Design; 1993; (pp. 1344–1351) Chem. Materials (5).

A. MacInnes, et al; Indium Tert–Butylthiolates as Single Source Precursors for Indium Sulfide Thin Films: is Molecular Design Enough?; 1993; (pp. 95–104) J. Organometallic Chem. 449.

C. Landry, et al; Siloxy–Substituted Alumoxanes: Synehesis from Polydialkylsiloxanes and Trimethylaluminium, and Application as Aluminosilicate Precursors; J. Mater. Chem. 1993; (pp. 597–602).

K. Andriano, et al; Synthesis of New Polymers with Inorganic Chains of Molecules; Journal of Polymer science, vol. XXX, 1958 (pp. 513–524).

G. Whiteside, et al; Articles; Molecular Self–Assembly and Nanochemistry: A chemical Strategy for the Synthesis of Nanostructures; Science, vol. 254, Nov. 1991; (pp. 1312–1319).

B. Yoldas; Alumina Gels that Form Porous Transparent $Al_2O_3$ Journal of Materials Science 1975; (pp. 1856–1860).

A. Kareiva, et al; Carboxylate–Substituted Alumoxanes as Processable Percursors to Transition Metal–Aluminum and Lanthanide–Aluminum Mixed–metal Oxides: Atomic Scale Mixing via a New Transmetalation Reactio; 1996 (pp. 2231–2340) Chem. Mater. 8.

R. Callender; Aqueous synthesis of Water–Soluble Alumoxanes:Environmentally Benign Precursors to Alumina and Aluminum–based Ceramics; 1997; (pp. 2418–2433) Chem. Mater. 9.

C. Vogelson, et al; Inorganic–Organic Hybrid and Composite Materials Using Carboxylate–Alumoxanes; World Ceramics Congress, Jun. 14–19, 1998; (pp. 499–506).

Slides presented at $9^{th}$ Annual World Ceramics conference in Florence, Italy; Jun. 1999; (pp. 1–11). Vogelson et al.

Tomlinson et al. Thermal Conductivity of Epoxy resin–Aluminum (0 to 50%); and Diavalent Chromium in Alkaline Earth Silicate Systems; 1977; (pp. 1689–1691) J. Materials Sci (12).

4-hydroxybenzoic acid 4-aminobenzoic acid dimethylolpropionic acid
(2,2-bis-(hydroxymethyl)propionic acid)

diphenolic acid
(4,4-bis(4-hydroxyphenyl)valeric acid)

6-aminohexanoic acid
(6-aminocaproic acid)

lysine
(2,6-diaminohexanoic)

chemically functionalized
carboxylate-alumoxane
Type I chemically functionalized
carboxylate-alumoxane
Type II resin cross-linking
agent 1. Mix epoxide and carboxylate alumoxane.

2. Pour into mold and cure at ca. 140°C for 2 hours.

METHODS AND MATERIALS FOR FABRICATION OF ALUMOXANE POLYMERS

STATEMENT REGARDING FEDERALLY SPONSORED RESEARCH OR DEVELOPMENT

Research leading to this invention was federally supported, in part, by grant no. DMI 9561682 from the National Science Foundation, and grant no. N000 1496-0147 from the Defense Advanced Research Project Agency.

FIELD OF THE INVENTION

This invention relates generally to compositions of matter and methods for the preparation of composite and hybrid polymers and resins in which at least one component is a chemically modified carboxylate-alumoxane. The carboxylate-alumoxanes are chemically bonded into the polymer backbone through reaction of the appropriate functional groups of a polymer precursor with the carboxylate-alumoxane. The method of the present invention can be used to produce polymers with organic and inorganic backbones. The polymers produced according to the invention can be either a thermoset or a thermoplastic and can be prepared by either a condensation polymerization reaction or an addition polymerization reaction. The invention provides for the formation of carboxylate-alumoxane materials prepared by the reaction of carboxylate-alumoxanes with polymer precursors including without limitation: epoxides, phenol-formaldehyde resins, polyamides, polyesters, polyimides, polycarbonates, polyurethanes, quinone-amine polymers, and acrylates.

BACKGROUND OF THE INVENTION

Condensation polymers are an important class of polymers that are prepared by the reaction of low molecular weight precursors that contain reactive functional groups such as amines, hydroxyls, acid chlorides, anhydrides and carboxylic acids. Polymeric materials prepared by condensation polymers include (but are not limited to) epoxies, phenol-formaldehyde resins, polyurethanes, polyamides, polyesters, polyimides, polycarbonates, quinone-amine polymers and polysulfones. These materials possess a range of properties and their applications are widespread.

Another name for the class of materials known as condensation polymers are thermoset polymers. Thermosettable polymers, in general, exist as liquids that, upon heating, undergo reactions to form solid, highly cross-linked polymer matrices. Once formed, thermoset polymers cannot be reformed into different shapes by heating.

In general, unfilled thermoset polymers tend to be harder, more brittle and not as tough as thermoplastic polymers. Thus, it is common practice to add a second phase (i.e., fillers) to thermosetting polymers to improve their properties. In addition, incorporation of fillers into the polymer matrices also strengthens and stiffens the polymer matrix allowing the polymers to be used in an expanded range of structural applications.

A common technique for improving the properties of thermoset resins is the use of inorganic fillers (*Handbook of Fillers and Reinforcements for Plastics* 11–58; Katz, H. J. and Milewski, J. V., eds.; Van Nostrand Reinhold Co.; New York). Inorganic fillers impart a number of desirable mechanical and barrier properties to the polymer. These properties include improved tensile strength, stiffness, abrasion resistance, dimensional stability and barriers to gases, solvents and water-vapor. As a second phase, the inorganic fillers can also affect other polymer properties such as pot life, cure exotherms, shrinkage, thermal conductivity, thermal shock resistance, heat deflection temperature, machinability, hardness, compressive strength, flexural strength, impact strength and electrical conductivity. The properties of polymers can also be modified by incorporation of a second organic or polymer phase into the thermoset polymers. For example, epoxy resins are routinely toughened (strengthened) by the incorporation of an elastomeric polymer.

The extent to which the inorganic fillers affect polymer properties is closely associated with the volume fraction of filler incorporated into the polymer, the particle size of the filler and the degree to which the filler is bound to the polymer matrix. Thus, the properties of the filler-modified polymers depend on the size, shape and dispersion uniformity of the inorganic modifier, as well as the degree of interaction between the inorganic modifier and the organic matrix. Therefore, the best performance is achieved with inorganic fillers consisting of small particles that are uniformly dispersed throughout the polymer and interact strongly with the organic matrix.

Until recently, the particle sizes of fillers used to improve polymeric properties have been on the micron length scale or even larger. These dense fillers have relatively low surface areas. The surface area of a filler is one of its more important properties, as the surface area determines the amount of contact and bonding between the polymer and the filler (Katz and Milewski, 1978). The size of the particles also determines the volume fraction that can be obtained with a given filler at a given weight loading. Most of the properties (mechanical and barrier) of filled polymers are directly related to volume fraction (and correspondingly to the particle size) of the fillers.

The greatest effect of fillers on the properties of polymer-filler composites appears to occur for fillers possessing dimensions on the nanometer length scale. Nano-particles are ordinarily defined as materials with sizes ranging from 1 nm to 1 $\mu$m. Nano-particles have higher surface areas and at the same weight have higher volume loadings than do larger particles. The total sum of the interactions between filler particles and the polymer are larger for nanometer sized particles than for larger particles. In addition, smaller particles produce smaller stress concentrations in the composite material. Unfortunately, the handling and dispersing of nanometer sized particles can be difficult; for example, small particles rapidly build up large static charges that can lead to the formation of hazardous breathable dusts. Additionally, inorganic oxides are hydrophilic, while most polymers are hydrophobic. This leads to segregation of the two phases and agglomeration of the powders resulting in a decrease in the overall performance of the polymer composite. Hence, it is desired to provide a technique for incorporating advantageous nanoparticle fillers into condensation polymers.

Like condensation polymers, addition polymers are an increasingly important class of polymers and have widespread applications. Addition polymers are prepared by the reaction of a monomer with an unsaturated group. Industrially, addition polymerizations are typically carried out in one of four general ways: in bulk, in solutions, in suspensions, or in emulsions. For the bulk case, only a monomer and polymerization initiator are reacted exothermically to produce polymers such as polystyrene, or poly (vinyl chloride). While this process is usually difficult to control and generates a lower yield polymer, it does have the advantages of producing polymers with high optical clarity and low contamination.

Solution polymerization is similar to bulk polymerization with the simple addition of a solvent medium. The advantage of solution polymerization is that the solvent allows for heat transfer during the reaction, which results in a much higher yield of polymer. The disadvantage of solution polymerization is that solvents must be chosen carefully, as side chain reactions can occur. Solution polymerization, however, is used frequently to polymerize such monomers as vinyl acetate and ethylene. Suspension polymerization, while utilizing a solvent, is much more akin to the bulk polymerization method rather to the solution method, in that droplets of the monomer are suspended in a carrier in which the monomer is insoluble. The carrier allows the advantageous transfer of heat, and the occurrence of unwanted side reactions is drastically diminished. Finally, emulsion polymerization is similar to suspension polymerization with two important differences: (1) the monomer droplet size is smaller, and (2) the initiator is insoluble in the monomer, but soluble in the carrier. This method is chiefly used to polymerize acrylics, poly(vinyl acetate), and numerous other copolymers. The advantage to emulsion polymerization is that the chain length of the monomer can be controlled without regard to reaction rates.

These different polymerization methods are based on several features associated with addition reactions: (1) the mass of the polymer decreases with increasing temperature and reaction rate, (2) the longer the reaction time, the more monomer is consumed and consequently, the greater the polymeric yield, (3) the reaction time and the molecular weight of the synthesized polymer are unrelated, and (4) the highest molecular weight polymer possible is formed immediately after the reaction begins and does not vary during the remainder of the reaction time. Although the incorporation of fillers into thermoplastic polymers does not provide the same advantages that it does for thermoset polymers, there are nonetheless instances where it is desirable to incorporate fillers into thermoplastic polymers.

In both condensation and addition polymerizations, the performance of the polymer-filler compound is strongly dependent on the strength of the interaction between polymer and filler. There are a number of interactions that can occur between the polymer and the inorganic filler, including van der Waals and dipole-dipole interactions, hydrogen bonding and covalent bonding. The weakest interactions between the polymer and the filler are the van der Waals and dipole-dipole interactions, with hydrogen bonding affording the next strongest interaction. The strongest interaction is obtained through covalent bonding. The polymer-filler covalent bonding interactions are on the order of 30 to 100 times greater than those that can be obtained by hydrogen bonding (G. Whitesides, et al; Articles; *Molecular Self-Assembly and Nanochemistry: A Chemical stratgy for the Synthesis of Nanostructures*; 254 Science 1312–1319 (November 1991)). Covalent bonding of the filler particles to the polymer lattice allows better transfer of mechanical loads to the particles, thereby improving the mechanical properties of the resulting polymer-filler compounds. Covalent attachment of the particles to the polymer matrices can also promote toughening of the polymer composite, as numerous bonds must be broken before cracks can propagate through the polymer. It is therefore desirable to identify small size (i.e., nanometer scale) inorganic fillers that can be readily incorporated into polymer matrices through covalent bonds.

Ceramic materials have excellent mechanical properties, such as heat-resistance, wear-resistance and strength, however, they are typically brittle and difficult to form into complex shapes. In addition, the rational chemical design of new ceramics (and inorganic materials in general) is poorly understood (A. MacInnes, et al; *Indium tert-butylthiolates as Single Source Precursors for Indium (II) Sulfide Thin Films: Is Molecular Design Enough*; 449 Journal of Organometallic Chemistry 95 (1993)). In contrast, organic polymers and resins are readily processed by a variety of methods. Possibly the most important property of organic polymers is the ease with which their physical properties may be modified through synthetic chemistry.

We have previously reported that aluminum-oxide nanoparticles (5 to 80 nm) can be prepared by the reaction of the mineral boehmite with carboxylic acids. The identity of the carboxylic acid appears to control the size of the nanoparticles. These materials are termed carboxylate-alumoxanes and may be prepared with an almost limitless variety of functional groups.

The aluminum based sol-gels (Yoldas, B; *Alumina Gels that Form Porous Transparent $Al_2O_3$*; Journal of Material Science 1856–1860 (1975)) formed during the hydrolysis of aluminum compounds belong to a general class of compounds, namely alumoxanes. These materials were first reported in 1958 (Andrianov, K. et al.; *Synthesis of New Polymers with Inorganic Chairs of Molecules*; 30 Journal of Polymer Science 513–524, (1958)) with siloxide substituents, however, they have since been prepared with a wide variety of substituents on aluminum. Recent work has shown that the structure of alumoxanes resembles a three dimensional cage (Apblett, A. et al. *Synthesis and Characterization of Triethylsiloxy-Substituted Alumoxanes: Their Structural Relationship to the Minerals Boehmite and Diaspore*; American Chemical Society 167–181 (1992) (hereinafter "Apblett et al. (1992)") and (Landry, C. et al.; *Siloxy-Substituted Alumoxanes: Synthesis from Polydialkylsiloxanes and Trimethylaluminum, and Applications as Aluminosilicate Precursors*; Journal of Materials Chemistry 597–602 (1993)). For example, siloxy-alumoxanes, $[Al(O)(OH)_x(OSiR_3)_{1-x}]_n$, consist of an aluminum-oxygen core structure (FIG. 1) analogous to that found in the mineral boehmite, $[Al(O)(OH)]_n$, with siloxide substituents surrounding the core. In the siloxy-alumoxanes, the "organic" substituent typically resembles that shown in FIG. 2. However, the carboxylate anion, $[RCO_2]^-$, is an isoelectronic and structural analog of the organic portion found in the siloxy-alumoxanes and is known to act as a bridging ligand across two aluminum centers (FIG. 3), (Koide, Y. et al.; *Alumoxanes as Cocatalysts in the Palladium-Catalyzed Copolymerization of Carbon Monoxide and Ethylene: Genesis of a Structure-Activity Relationship*; 15 Organometallics 2213–2226 (No. 9, 1996)) and Koide, Y. et al.; $[Al_5(Bu)_5(\mu_3-O)_2(\mu-OH)_2(\mu O_2CPh)_2]$: *A Model for the Interaction of Carboxylic Acids with Boehmite*; American Chemical Society 4025–29 (1995)). Based upon this approach, the reaction of boehmite, $[Al(O)(OH)]_n$, with carboxylic acids, has been developed (Landry et al., *From Minerals to Materials: Synthesis of Alumoxanes from the Reaction of Boehmite with Carboxylic Acids*; 5 Journal of Materials Chemistry 331 (1995) (hereinafter, "Landry et al. (1995)") for Equation (1) below.

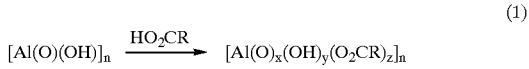

(1)

Carboxylate-substituted alumoxanes have been well characterized (Landry et al. 1995 and (Callendar, R. et al.; *Aqueous Synthesis of Water-Soluble Alumoxanes: Environ-* mentally Benign Precursors to Alumina and Aluminum-Based Ceramics; American Chemical Society 2418–33 (1997) (hereinafter, "Callendar et al. (1997)"). Solution particle-size measurements show that carboxylate-alumoxanes are nano-particles, with sizes ordinarily ranging from 1–1000 nm. The carboxylate ligand is bound to the aluminum surface, and is only removed under extreme conditions. The carboxylate-alumoxane materials prepared from the reaction of boehmite with carboxylic acids are air and water stable materials that are easily processable. The physical properties of these alumoxanes are highly dependent on the identity of the alkyl substituents, R, and range from those associated with insoluble crystalline powders to powders that readily form solutions or gels in hydrocarbon solvents and/or water. These alumoxanes are indefinitely stable under ambient conditions, and are adaptable to a wide range of processing techniques. The alumoxanes can be easily converted to aluminum oxide upon mild thermolysis, while they also react with metal complexes to form doped or mixed aluminum oxides (Kareiva, A. et al.; Carboxylate-Substituted Alumoxanes as Processable Precursors to Transition Metal-Aluminum and Lanthanide-Aluminum Mixed-Metal Oxides: Atomic Scale Mixing via a New Transmetalation Reaction; American Chemical Society 2231–2340 (1996) (hereinafter, "Kareiva et al. (1996)").

Apblett et al. (1992) describes a method for the synthesis of carboxylate-substituted alumoxanes through the reaction of pseudoboehmite and carboxylic acids in refluxing xylenes. If the carboxylic acid is a heat stable liquid, then the carboxylic acid can be prepared by addition of the pseudoboehmite to the liquid acid with reflux heating for several days. Apblett et al. (1992) describes the synthesis of several alumoxanes using different carboxylic acids ($HO_2CR$, $R=CH_3, C_5H_{11}, CH_2Cl, C_7H_{15}, CH_2CH_2OCH_3$, or $C_nH_{2n+1}$ where n=1–3). However Apblett et al. (1992) do not describe the preparation of carboxylate-alumoxanes containing functional groups that can be incorporated into polymer matrices through covalent bonding.

Landry et al. (1995) expand on the synthesis and characterization of carboxylate-alumoxanes including those listed above and additionally describe new carboxylate-alumoxanes prepared using valeric and lauric acids. However, Landry et al. (1995) do not describe the synthesis and use of alumoxanes containing functional groups that can be readily incorporated through chemical bonding to polymer matrices. Kareiva et al. (1996) describe the preparation of carboxylate-alumoxanes and a metal-exchange reaction using metal acetylacetonate compounds to prepare metal exchanged alumoxanes that can be decomposed in air at high temperatures to prepare mixed metal oxides. A detailed discussion of metal-exchanged alumoxanes can be found in U.S. application Ser. No. 09/058,587 filed Apr. 10, 1998 and titled Metal-Exchanged Carboxylato-Alumoxanes, now U.S. Pat. No. 6,207,130, incorporated herein by reference.

The synthesis of two alumoxanes not included by Apblett et al. (1992) and Landry et al. (1995) were included in Kareiva et al. (1996). These alumoxanes were prepared by the reaction of pseudoboehmite with methacrylic acid and (methoxyethoxy)ethoxy acetic acid respectively. Although methacrylato-alumoxanes contain a reactive group that could potentially be incorporated into polymers through free radical addition mechanisms, they were used as precursors to the formation of mixed metal oxides and Kareiva at al. (1996) did not discuss the use of these materials as potential candidates for incorporation into polymer matrices. Callender et al. (1997) describe the synthesis of carboxylate-alumoxanes by reactions of carboxylic acids and pseudoboehmite using water as a solvent. Syntheses of carboxylate-alumoxane from boehmite and the carboxylic acids (methoxyethoxy)ethoxy acetic acid, (methoxyethoxy) acetic acid, methoxy acetic acid and acetic acid were described. However, these materials were prepared to be used as precursors in the production of ceramics and do not contain functional groups that can be used to covalent bond the alumoxanes to a polymer matrix. In summary, the syntheses and uses of carboxylate-alumoxanes cited in the above works were directed towards their use as precursors that are thermally decomposed to provide oxide ceramics and powders.

Hence, it is desirable to provide a technique for synthesizing alumoxanes, and in particular carboxylate-substituted alumoxanes, and incorporating them as fillers into various thermosetting and thermoplastic polymers.

SUMMARY OF THE INVENTION

The present invention provides methods and materials for covalently bonding nano-sized inorganic fillers comprising alumoxanes into a wide range of polymer matrices. More specifically, the present invention relates to the substitution, completely or partially, of one or more of the constituents of an organic or inorganic polymer system with a carboxylate-alumoxane that is chemically functionalized with appropriate substituents to allow for chemical bonding between the carboxylate-alumoxane and the polymer.

The invention describes, and provides methods for the preparation of, carboxylate-alumoxane/polymer composite and hybrid materials through the reactions of amine, hydroxyl, acrylic and vinyl substituted carboxylate-alumoxanes with low molecular weight polymer precursors containing the appropriate reactive functional groups, such as oxiranes, acid chlorides, anhydrides, carboxylic acids, quinones, and olefins. These reactions lead to incorporation of the carboxylate-alumoxanes into the polymer matrix through chemical bonding between the carboxylate-alumoxane and the polymer. In an alternative embodiment, more than one type of substituted carboxylate-alumoxane, with or without additional low molecular weight polymer precursors may be employed, such that the different reactive substituents on each of the substituted carboxylate-alumoxanes react with each other, thus forming chemical bonding between the different carboxylate-alumoxanes and any polymer present. The self-reaction of the reactive substituent on the carboxylate-alumoxane may also lead to an alumoxane-based polymer.

The inventive method is based on the use of chemically functionalized carboxylate-alumoxanes that can be described by the general formula:

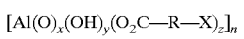

and/or

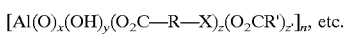

where $X—R—CO_2^-$ and $R'—CO_2^-$ are mono-carboxylates, R and R' are from the group of a hydrogen and/or an organic group, and X is a chemically reactive substituent. The organic group is preferably an alkyl, alkenyl, aromatic, haloalkyl, haloalkenyl, haloaromatic group or alkyl, alkenyl, aromatic ether group or an organic group containing a hetero-atom including, oxygen, nitrogen, sulfur, or phosphorous. The chemically reactive substituent is preferably a hydroxyl, amine, acrylate, vinyl, olefin, or similar chemical substituent. These components can be prepared by the methods described in Landry et al. (1995), Apblett et al. (1992), Kareiva et al. (1996), or the preferred method of Callender et al. (1997), all of which are incorporated herein by reference. The composition of the carboxylate-alumoxane varies depending on the starting materials employed and the details of the synthetic method employed, as set out in Callender et al. (1997).

The present disclosure describes the use of amine, hydroxyl and acrylic functionalized carboxylate-alumoxanes to prepare a wide range of alumoxane-polymer composites. The classes of alumoxane polymers described herein include but are not limited to: epoxies, phenol-formaldehyde resins, polyamides, polyesters, polyimides, polycarbonates polyurethanes and quinone-amine polymers. Thus, the present invention includes the syntheses of chemically functionalized carboxylate-alumoxanes containing aromatic and aliphatic amines and aromatic and aliphatic hydroxyls and their incorporation in a range of polymer matrices to produce alumoxane-polymer composites.

BRIEF DESCRIPTION OF THE DRAWINGS

For an introduction to the detailed description of the preferred embodiments of the invention, reference will now be made to the accompanying drawings, wherein.

DETAILED DESCRIPTION OF THE PREFERRED EMBODIMENTS

This invention discloses the use of amine, hydroxyl and acrylic functionalized carboxylate-alumoxanes to prepare alumoxane-polymer composite and hybrid materials. The functionalized alumoxanes are cross-linked with a reactive compound to form a polymeric compound.

Figure 4:
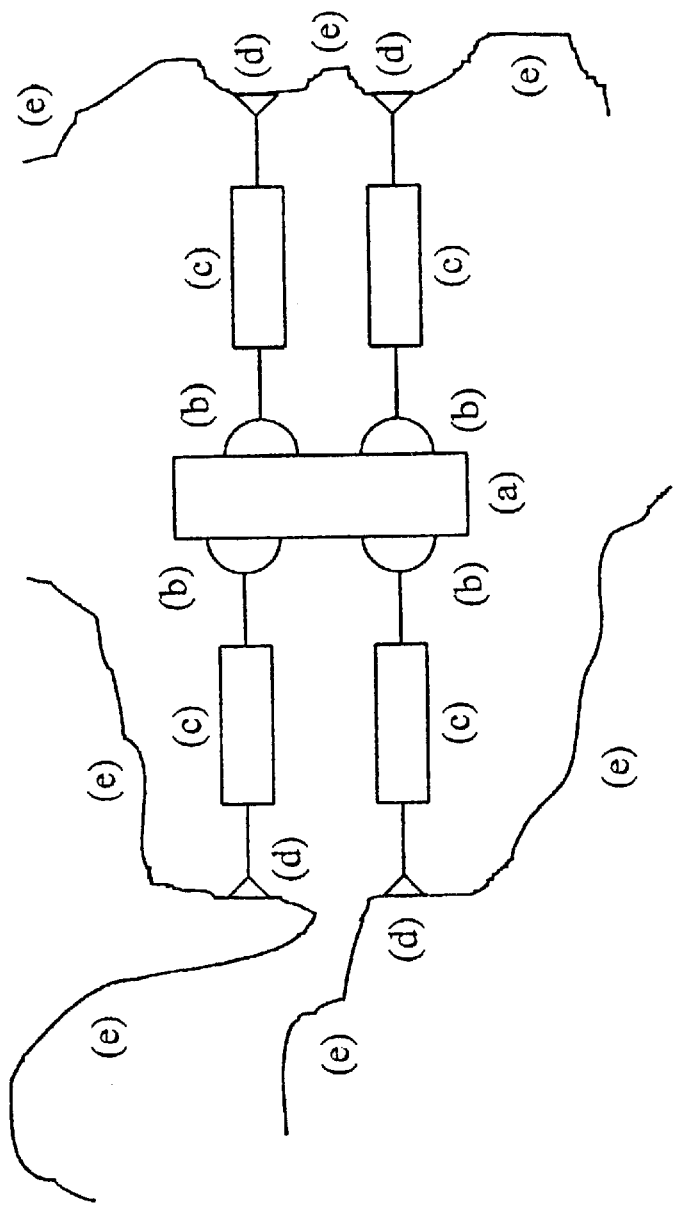
FIG. 4 is a schematic diagram showing a postulated structure for a generic carboxylate-alumoxane/polymer hybrid or composite material consisting of (a) an aluminum oxide nano-particle, (b) a carboxylate group chemically bonded to the aluminum-oxide particles surface, (c) a linkage unit of the carboxylate alumoxane, (d) a chemically reactive substituent, and (e) a reactive compound capable of cross-linking with substituent (d)

In the terms of this invention, it is possible to describe a generic carboxylate-alumoxane/polymer hybrid or composite material to consist of (a) an aluminum oxide nano-particle, (b) a carboxylate group chemically bonded to the aluminum-oxide particles surface, (c) a linkage unit of the carboxylate alumoxane, (d) a chemically reactive substituent, and (e) a reactive compound capable of cross-linking with substituent (d). This structure is represented schematically in FIG. 4. The combination of parts (a) to (c) is referred to herein as a carboxylate-alumoxane. The combination of parts (a) to (d) is herein termed a chemically functionalized carboxylate-alumoxane. Finally, the combination of parts (a) to (e) is the subject of this invention. The reactive compound, which may comprise a polymer precursor, a polymer with reactive groups, or another functionalized alumoxane, cross-links with the alumoxane (a)–(d) to form a polymer backbone. The polymer back-bone may be formed separately from the carboxylate-alumoxane or may contain the carboxylate-alumoxane as one of its constituents. The polymer back-bone can be organic or inorganic.

Figure 1:
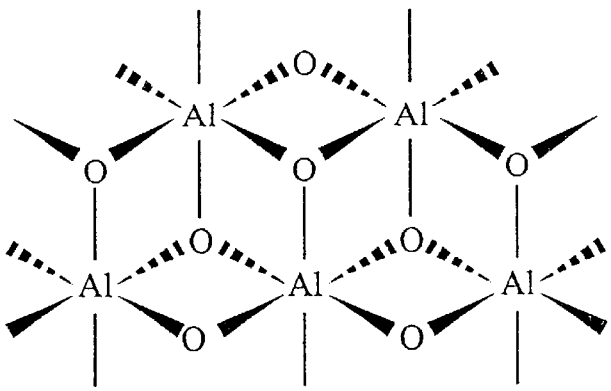
FIG. 1 is a schematic diagram showing a postulated structure for an aluminum-oxygen core structure analogous to that found in the mineral boehmite, $[Al(O)(OH)]_n$.
Figure 2:
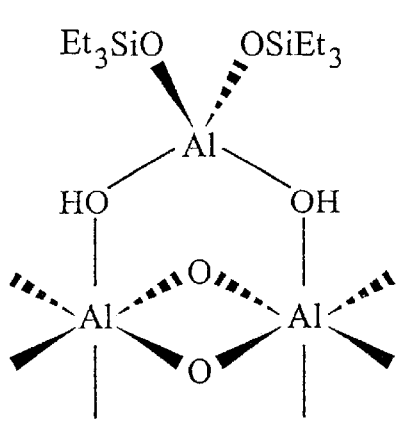
FIG. 2 is a schematic diagram showing a postulated structure for siloxy-alumoxanes, with siloxide substituents surrounding the core of FIG. 1.
Figure 3:
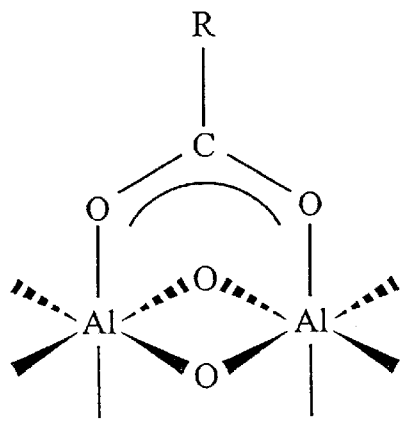
FIG. 3 is a schematic diagram showing how a carboxylate anion, $[RCO_2]^-$, is an isoelectronic and structural analog of the organic portion found in the siloxy-alumoxanes and is known to act as a briding ligand across two aluminum centers.

As discussed above, carboxylate-alumoxanes, also known as carboxylato-alumoxanes, are inorganic-organic hybrid materials that contain a boehmite-like $([AlO(OH)]_n)$ aluminum oxygen core (FIG. 1), to whose surfaces are attached covalently bound carboxylate groups (i.e., $RCO_2^-$, where R=alkyl or aryl group) (FIG. 3) (Landry et al., 1995). The carboxylate groups are tethered to the aluminum-oxygen surface through bidentate bonding of the carboxylate group to two aluminum atoms on the surface of the boehmite particle. The properties and processability of the carboxylate-alumoxanes are strongly dependent on the nature and size of the attached organic groups. Until recently, carboxylate-alumoxanes were not very useful as processable precursors because they were difficult to prepare. Prior to discovery of a new synthetic route (Apblett et al., 1992), carboxylate-alumoxanes were prepared by the reaction of pyrophoric organo-aluminum (e.g., triethylaluminum) with carboxylic acids (Kimura, Y. et al.; *Coordination Structure of the Aluminum Atoms of Poly (Methylaloxane), Poly(Isopropoxylaloxane) and Poly [(Acyloxy)Aloxane]*; 9 Polyhedron 371–76, No. 23 (1990)) and (Pasynkiewicz, S.; *Alumoxanes: Synthesis, Structures, Complexes and Reactions*; 9 Polyhedron 429–53, No. 2/3 (1990)). The high cost of the organometallic compounds and the difficulty of handling highly reactive materials provided a high barrier to the use of carboxylate-alumoxanes as materials for improving the properties of thermoset polymers.

Figure 5:
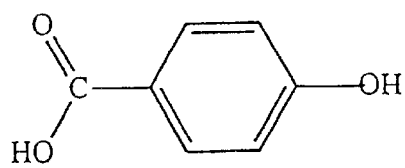
FIG. 5 is several schematic diagrams showing a representative sample of carboxylic acids suitable for reaction with boehmite or pseudoboehmite.
Figure 5:
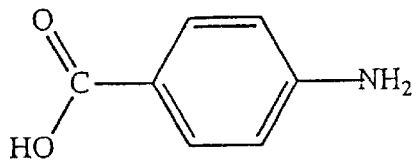
Figure 5:
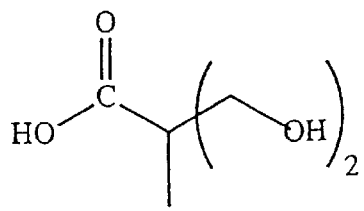
Figure 5:
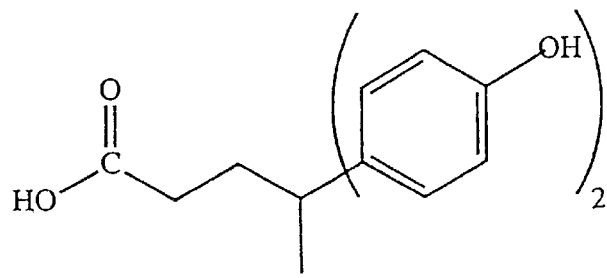
Figure 5:
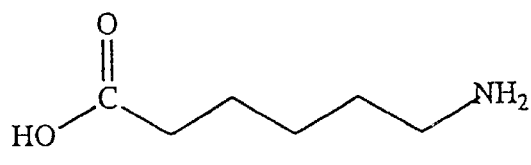
Figure 5:
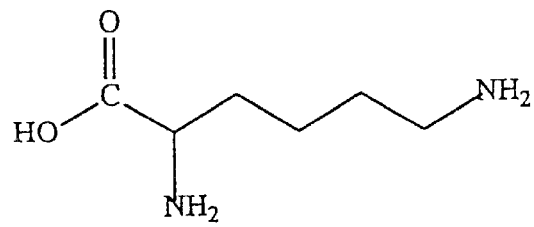

The preferred carboxylate-alumoxanes of the present invention are prepared by the reaction of boehmite or pseudoboehmite with carboxylic acids in a suitable solvent. In addition to the carboxylate groups, the carboxylic acids also contain terminal amine, hydroxyl or acrylic groups. A representative sample of suitable carboxylic acids is shown in FIG. 5. The boehmite (or pseudoboehmite) source can be a commercial boehmite product such as Catapal (A, B, C, D, or FI, Condea-Vista Chemical Company), boehmite prepared by the precipitation of aluminum nitrate with ammonium hydroxide and then hydrothermally treated at 200° C. for 24 hours, or boehmite prepared by the hydrolysis of aluminum trialkoxides followed by hydrothermal treatment at 200° C. Preferred methods for the preparation of the pseudoboehmite or boehmite particles are those that produce particle sizes of the carboxylate-alumoxanes below 1000 nm and more preferably below 100 nm.

The reaction of the pseudoboehmite (or boehmite) with the carboxylic acid can be carried out in either water or a variety of organic solvents (including, but not limited to toluene and xylene). However, it is preferable to use water as the solvent so as to the minimize the production of environmentally problematic waste. In a typical reaction, the carboxylic acids are added to boehmite or pseudoboehmite particles, the mixture is heated to reflux, and then stirred for a period of time. The water is removed and the resulting solids are collected. The solids can be re-dispersed in water or other solvents in which the alumoxane and other polymer precursor components are soluble. It is not necessary to remove the water if the functionalized alumoxanes are to be used in waterborne resin-based polymerization reactions.

The carboxylic acid can be any monocarboxylic acid. The carboxylic acid can be aromatic or aliphatic, and can contain hetero-atom functional groups such as hydroxyls, amines, etc. The solubility of the carboxylate alumoxanes is dependent only on the identity of the carboxylic acid residue, which is almost unrestricted according to the present invention, providing it contains a reactive substituent that reacts with the desired co-reactants. The solubilities of the carboxylate-alumoxanes are therefore readily controllable, so as to make them compatible with any desired co-reactants.

While these advantages are significant, the carboxylate-alumoxanes have additional benefits with respect to large scale production of ternary and quaternary ceramics. The most dramatic of these is the simplicity of the alumoxane methodology. The alumoxane route is simple, and can be halted and/or modified at any stage without significant effects on the products. A careful control of pH, the use of additives to inhibit precipitation, and slow concentration steps are not required, thus making the alumoxane route easier and quicker than prior art techniques. Another benefit with respect to large scale processing is the relatively low cost of the alumoxane precursors.

Alumoxane-polymer condensation polymer composites that can be produced in accordance with the present invention include, without limitation, epoxies, phenol-formaldehyde resins, polyamides, polyesters, polyimides, polycarbonates polyurethanes and quinone-amine polymers. In addition, we describe the incorporation of acrylic and alkene substituted carboxylate-alumoxanes such as methacrylate-alumoxane in polyacrylate and polyolefin composites.

To prepare the aromatic hydroxyl substituted carboxylate-alumoxanes, 4-hydroxybenzoic acid or diphenolic acid (4,4-bis(4-hydroxyphenyl)valeric acid) (FIG. 5) were added to the pseudoboehmite/boehmite sol and stirred with heating. In practice, any aromatic ring containing a hydroxyl group and a carboxylic acid can be used to prepare an aromatic hydroxyl functionalized carboxylate-alumoxane. To prepare the aliphatic hydroxyl substituted carboxylate-alumoxanes, dimethylolpropionic acid (2,2-bis-(hydroxymethyl) propionic acid) (FIG. 5) was added to an aqueous pseudo-boehmite/boehmite sol and stirred with heating. In practice, any aliphatic carboxylic acid containing a hydroxyl group can be used to prepare an aliphatic hydroxyl alumoxane. To prepare aromatic amine substituted carboxylate-alumoxanes, 4-aminobenzoic acid was added to an aqueous pseudo-boehmite/boehmite sol and stirred with heating. In practice, any aromatic ring containing a primary or secondary amine and a carboxylic acid can be used to prepare an aromatic amine functionalized carboxylate-alumoxane. To prepare aliphatic amine substituted carboxylate-alumoxanes, 6-aminohexanoic acid or 2,6-diaminohexanoic were added to an aqueous pseudo-boehmite/boehmite sol and stirred with heating. In practice, any aliphatic carboxylic acid containing a primary or secondary amine group can be used to prepare an aliphatic amine alumoxanes.

The carboxylate-alumoxanes containing functionalized carboxylic acids were then incorporated into a range of polymer matrices by reaction of the aliphatic and aromatic amines and aliphatic and aromatic hydroxyls with reactive groups of a number of low molecular weight polymer precursors. The preparation of the alumoxane-polymer composites are described in the following paragraphs.

The aliphatic and aromatic amine alumoxanes and the aliphatic and aromatic hydroxyl alumoxanes were reacted with a range of low molecular weight polymer precursors to form alumoxane-polymer composites having epoxy, phenol-formaldehyde resin, polyamide, polyester, polyimide, polycarbonate, polyurethane and quinone-amine polymer matrices. In general, the aliphatic and aromatic amine alumoxanes and the aliphatic and aromatic hydroxyl alumoxanes were dispersed into a solvent containing the low molecular weight polymer precursors and any additional components including, but not limited to: catalysts, defoamers, stabilizers, and initiators. The temperature was then increased to initiate cross-linking and to cause the composite material to polymerize and solidify. For some materials it was not necessary to supply any external heat, since the polymerization reaction could be carried out at room temperature.

Figure 6:
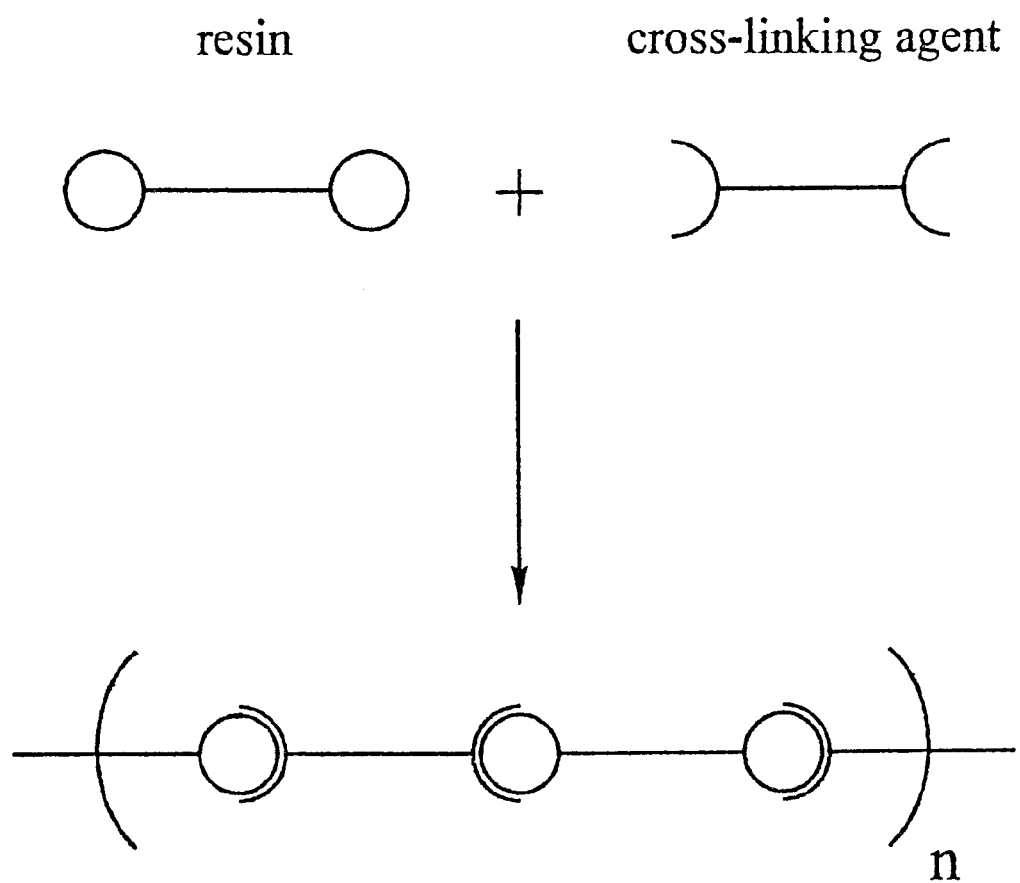
FIG. 6 is a schematic representation of the formation of a two-part epoxy resin via the reaction of a bifunctional oxirane and a hydroxyl or amine containing compound.

Epoxy resins are widely used thermoset materials with significant applications in electronics packaging, coatings and as structural materials. Epoxy resins are easily extruded and/or molded, have moderate strength, and low hardness (Stevens, M. P.; *Polymer Chemistry* 374–79; Oxford University Press, 1990). Epoxy resins generally consist of two parts: a resin and a hardener. FIG. 6 shows a schematic representation of the formation of a two part epoxy resin via the reaction of a bi-functional oxirane (resin) and hydroxyl or amine containing compound (cross-linking agent, also called the hardener). The resin component is commonly a low molecular weight bi-functional oxirane (i.e., epoxide ring containing). The hardener contains a cross-linking agent, which is also a low molecular weight compound having active hydrogens (e.g. hydroxyls or amines). The materials used most often for reaction with the oxirane ring are primary and secondary amines and hydroxyl groups (Tess, R. W.; *Epoxy Resins Chemistry and physics of Modern Material*; Intertext (1993)); (McAdams, L. V. and Gannon, J. A.,; 6 *Encyclopedia of Polymer Science and Engineering* 322–82 (1985)); (Ellis, B., editor; *Chemistry and Technology of Epoxy Resins*; Ch. 1, 2, 4, and 7; Blackie Academic and Professional (1993)). Although the application of temperature may be sufficient to cause cross-linking between the epoxy and the amines or hydroxyls, catalysts such as basic tertiary amines are commonly used to initiate and accelerate the cross-linking reaction. Alternatively, the reaction can be catalyzed by photolysis.

Figure 7:
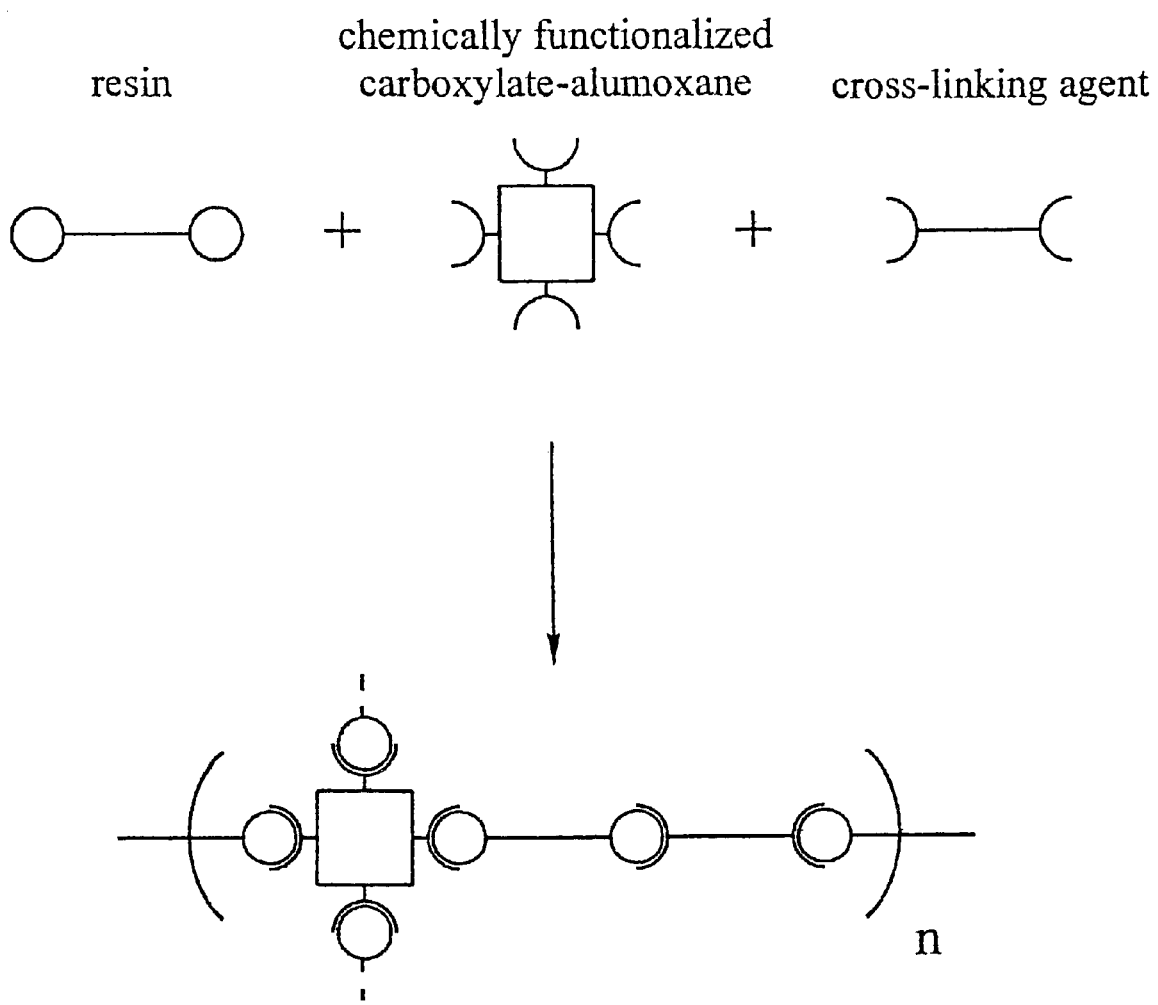
FIG. 7 is a schematic representation of a composite material formed by the partial replacement of an existing cross-linking agent with a chemically functionalized carboxylate-alumoxane.
Figure 8:
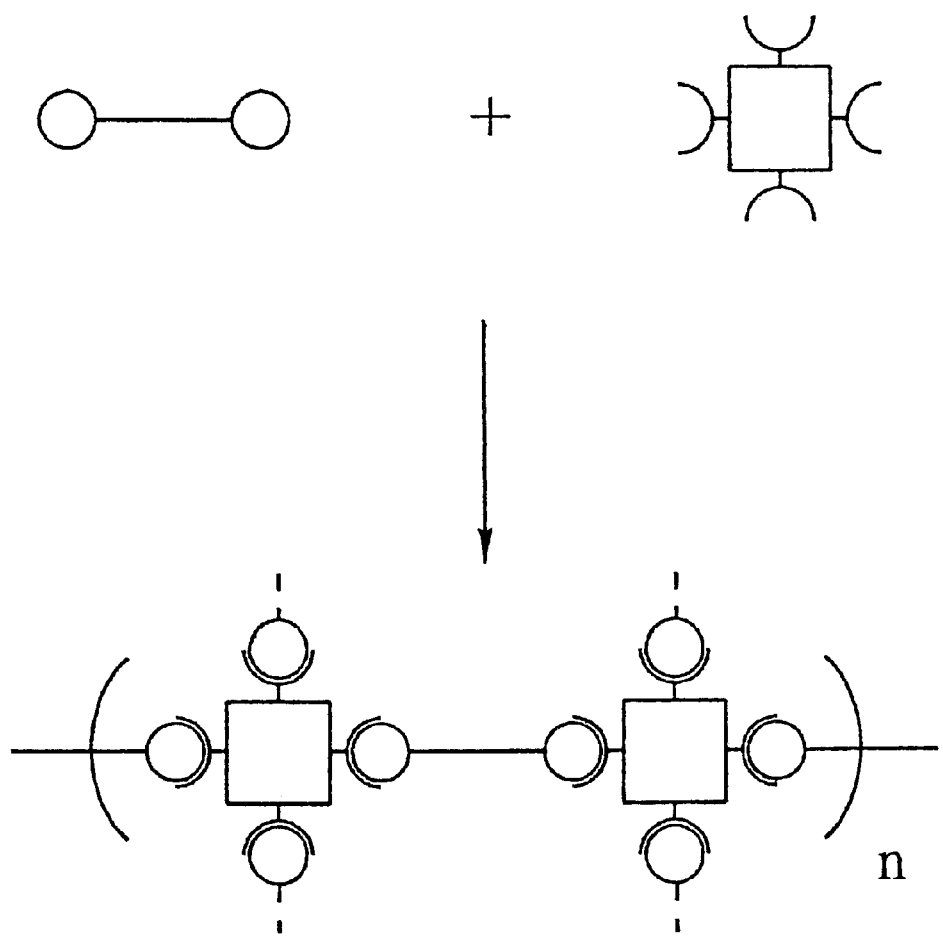
FIG. 8 is a schematic representation of a hybrid material formed using a chemically functionalized carboxylate-alumoxane as the cross-linking agent.
Figure 9:
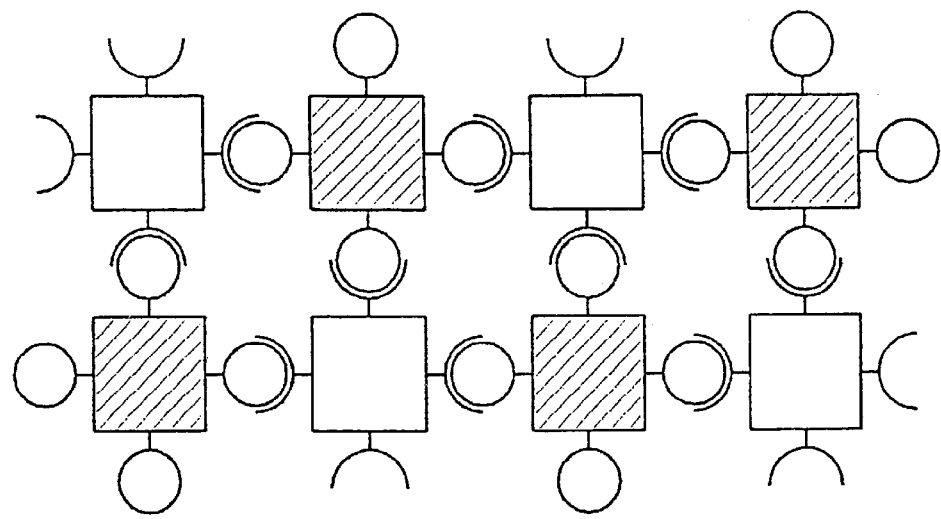
FIG. 9 is a schematic representation of two types of bis-alumoxane materials formed by the use of two chemically functionalized carboxylate-alumoxanes as the resin and cross-linking agent respectively.
Figure 9:
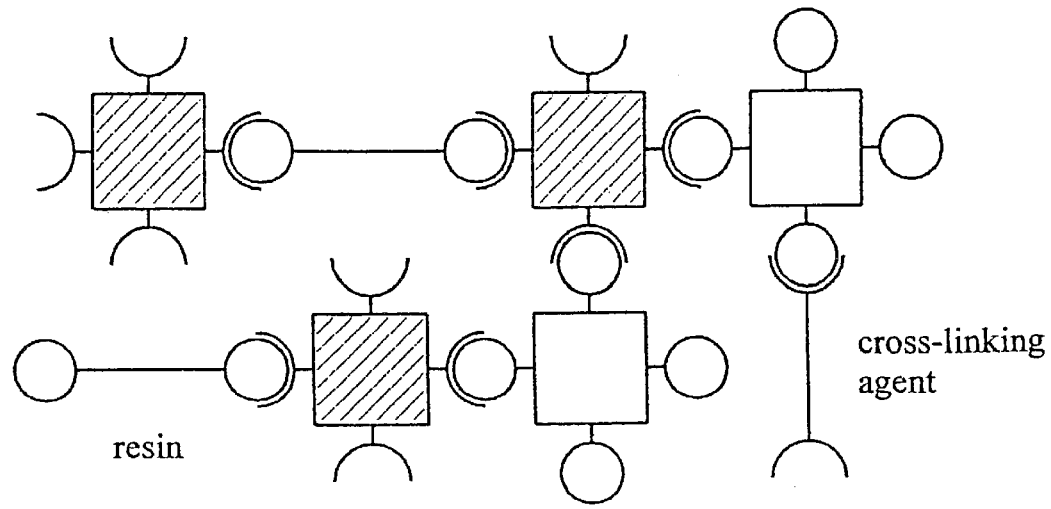

Using such epoxy resin systems, three generic classes of alumoxane-based materials are possible. First, a chemically functionalized carboxylate-alumoxane may be incorporated as an additional cross-linking agent into an existing resin/hardener system. Such an alumoxane-based material is termed herein a "composite material." FIG. 7 shows a schematic representation of a composite material formed by the partial replacement of an existing cross-linking agent with a chemically functionalized carboxylate-alumoxane. Second, the chemically functionalized carboxylate-alumoxane may be used in place of the cross-linking agent. Such a alumoxane-based material is termed herein a "hybrid material." FIG. 8 shows a schematic representation of a hybrid material formed from the use of a chemically functionalized carboxylate-alumoxane as the cross-linking agent. Third, two different chemically functionalized carboxylate-alumoxanes can partially or completely replace both the resin and hardener. Such an alumoxane-based material is termed herein a "bis-alumoxane material." FIG. 9 shows two schematic representations of two types of bis-alumoxane materials formed by the use of two chemically functionalized carboxylate-alumoxanes as the resin and cross-linking agent respectively.

Figure 10:
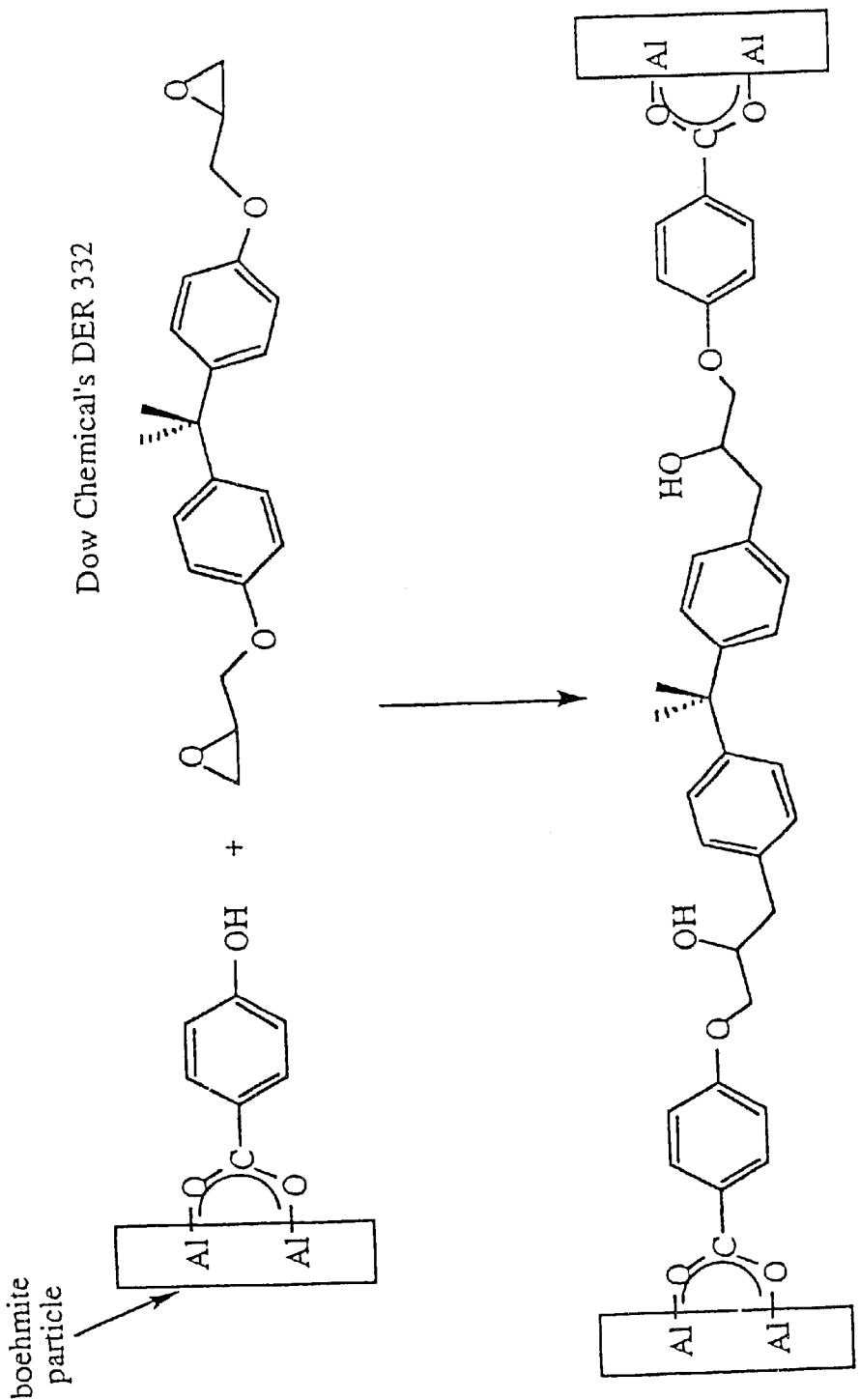
FIG. 10 is a simplified schematic of the reaction between a hydroxy functionalized alumoxane and an epoxy resin to form an alumoxane-epoxy hybrid material.

We have prepared carboxylate-alumoxane/epoxy hybrid materials through the reaction of amine and hydroxyl functionalized alumoxanes with commercially available epoxy resin components. FIG. 10 shows a simplified schematic of the reaction between the hydroxy functionalized alumoxane and an epoxy resin (Dow Chemical's DER 332) to form the alumoxane-epoxy hybrid material. Since the carboxylate-alumoxane surface is covered with the hydroxy-functionalized carboxylate groups, the carboxylate-alumoxane provides three-dimensional cross-linking with the polymer matrix. Hydroxyl functionalized carboxylate-alumoxanes that have been used to prepare the carboxylate-alumoxane/epoxy polymer hybrid materials include 4-hydroxybenzenato-alumoxane, diphenolato-alumoxane and dimethylol-propionato-alumoxane. It is also possible to prepare carboxylate-alumoxane-epoxy hybrid materials using amine functionalized carboxylate-alumoxanes. Both aromatic and aliphatic amines can be used in the preparation of the carboxylate-alumoxane-epoxy hybrid material. Amine functionalized carboxylate-alumoxanes that have been used to prepare the alumoxane-epoxy polymer composites include 6-aminohexanote-alumoxane, 2,6-diaminohexanate-alumoxane and 4-aminobenzenate-alumoxane. The use of aliphatic amine functionalized carboxylate-alumoxanes allows fabrication of alumoxane-epoxy composites at or near room temperature.

Although we have demonstrated the formation of alumoxane-epoxy composites using commercial resins such as Dow Chemical's DER 332, combinations of DER 332 and DER 732, Union Carbide's ERL (a cycloaliphatic resin), and Shell's EPI-REZ (a waterborne resin system), any commercially available epoxy resin can be used to prepare the carboxylate-alumoxane/epoxy polymer hybrid materials. To those skilled in the art, the reaction between any amine (primary or secondary) functionalized carboxylate-alumoxane or hydroxyl functionalized carboxylate-alumoxane and a resin containing an oxirane ring would lead to the formation of a carboxylate-alumoxane-epoxy polymer hybrid material.

Figure 11:
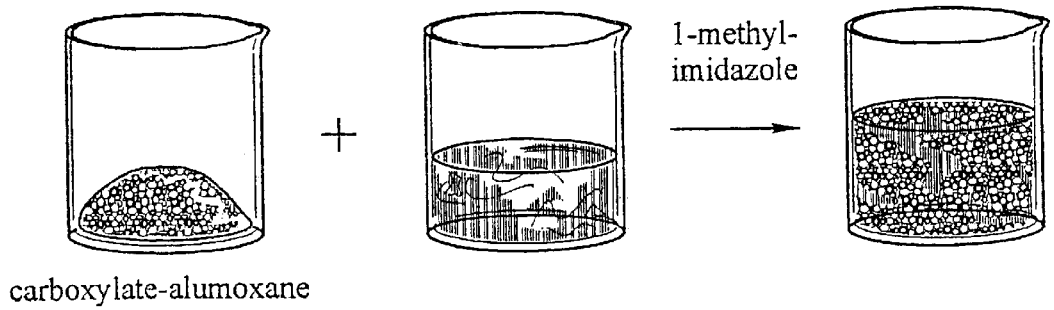
FIG. 11 is a schematic representation of the synthesis of a carboxylate-alumoxane/epoxide hybrid material.
Figure 11:
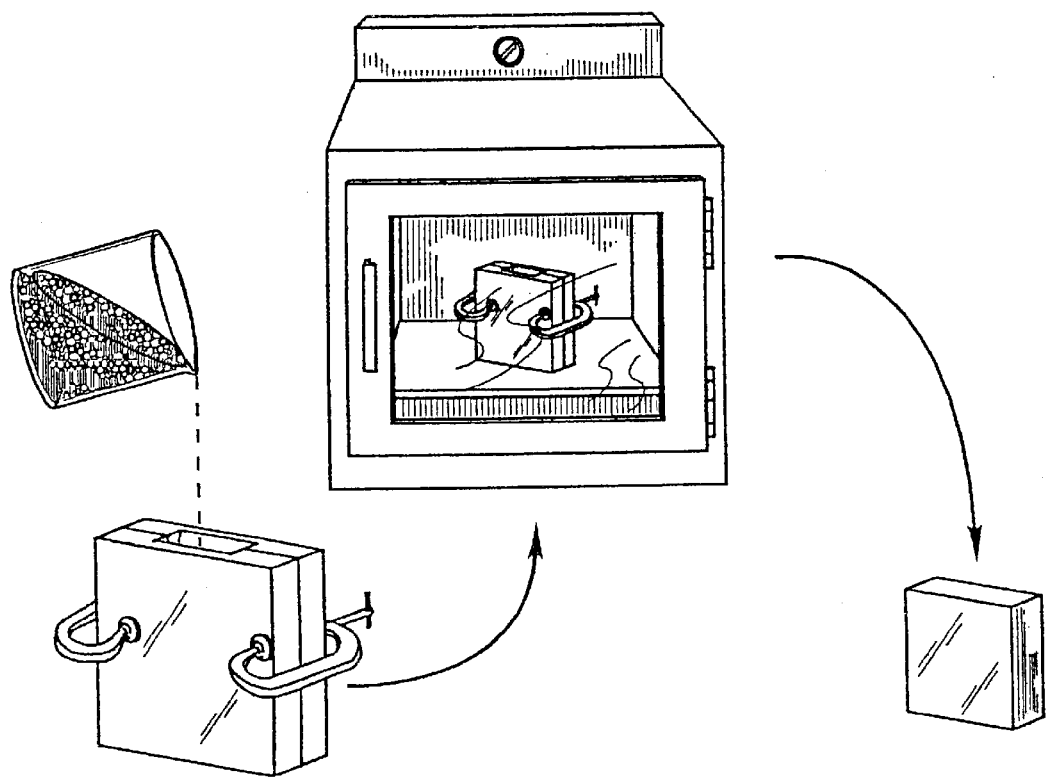

Several alternative methods may be employed to prepare carboxylate-alumoxane/hybrid materials, however, in a typical method a mixture of an epoxy resin and a chemically-functionalized carboxylate-alumoxane is formed in a ratio appropriate for the specific chemically-functionalized carboxylate-alumoxane used and in a quantity that mirrors that of the desired final hybrid material. FIG. 11 shows a schematic representation of the synthesis of a carboxylate-alumoxane/epoxide hybrid material. The set time may be determined by a number of methods, however, one of ordinary skill in the art will be able to develop alternate methods. A representative example of set time determination follows. Given that some epoxy resins are solid or highly viscous at room temperature, the resins should be gently warmed, in a temperature controlled water bath to melt. When the epoxy is mobile, the canister of epoxy is removed from the bath and placed under a mechanical stirrer equipped with a curled steel rotor. With vigorous stirring (ca. 700–1000 rpm) the chemically-functionalized carboxylate-alumoxane should be added and thoroughly mixed. As quickly as possible, the canister should be returned to the water bath, and a temperature sensor added. (A suitable temperature sensor would be a thermocouple.) The temperature should be carefully monitored with time. This temperature-time data can be used to determine mixing times for the final, molded, resin product. The maximum set-time for the studied system occurs at the peak in the exotherm data.

Figure 12:
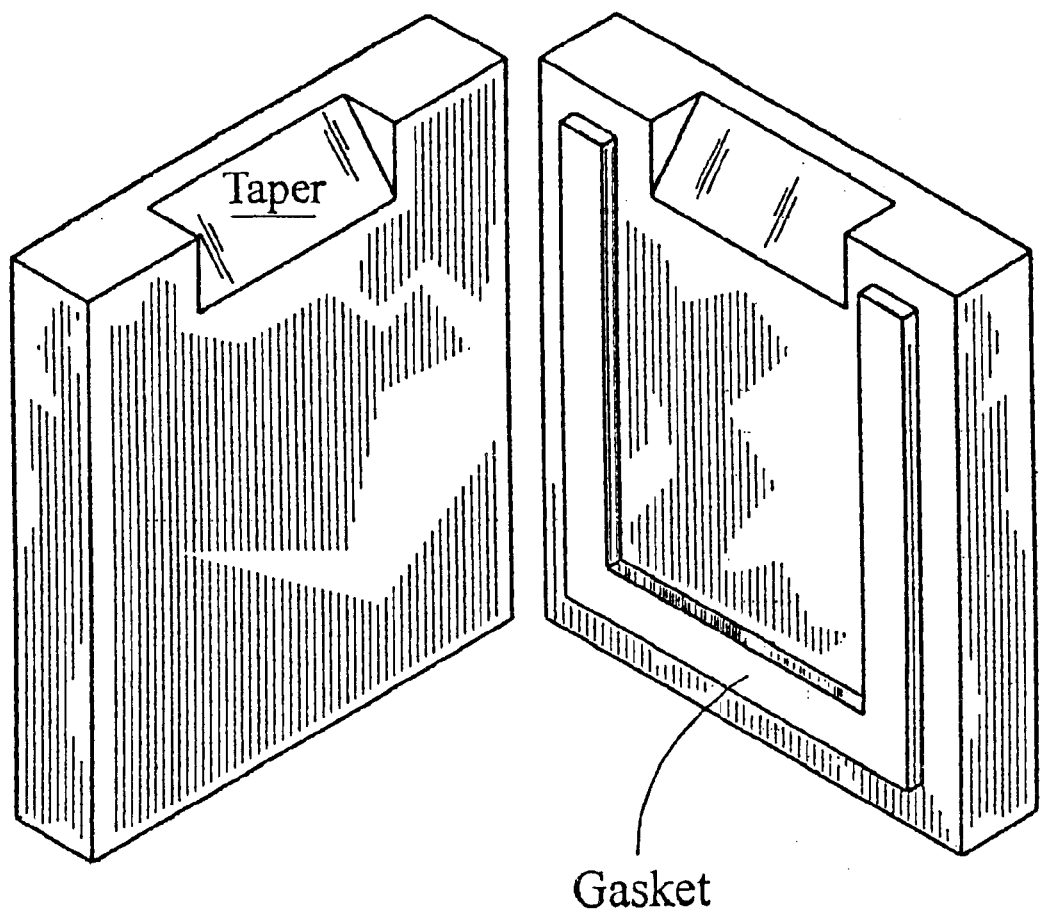
FIG. 12 is a perspective view a one embodiment of a mold suitable for use with the present polymers.

In order to allow for physical testing of the carboxylate-alumoxane modified resins uniform samples (6"×6" and 1 mm thick) can be produced using a simple mold consisting of two aluminum plates of reasonable thickness that have been tapered on one edge of one side so that when the two plates are placed together, with the tapers adjoining, a sort of funnel cavity is formed. A single flat rubber gasket fits around the edges and corners of three of the four sides of the mold (FIG. 12) such that the thickness of the gasket determines the thickness of the molded piece. The mold is cleaned using a razor blade to remove any particles remaining from previous use, and then scrubbed in opposing directions with a fine-grain steel wool pad. The plates are wiped with a cotton towel to remove any loose aluminum powder. Once prepared, the plates should be coated with an anti-sticking film such as Dexter Brand Frekote. Once the anti-stick coating has dried, the gasket is placed on one of the plates so as not to obstruct the tapered opening and the matching plate placed on top of the "sandwich." C-clamps or similar means can be used to hold the mold together. An appropriate amount of warmed epoxide resin is placed into a disposable beaker and placed under a mechanical stirrer fitted with a curled steel rotor. The time allowed for the total resin preparation is calculated based on the set-time (see above) minus about 3 minutes. When ready, the carboxylate-alumoxane should be added, and mixed thoroughly with the epoxy system. Once the materials are combined, the resin system is degassed by placing the mixture under a vacuum. As the pressure over the resin drops, a foam forms. After a few minutes the mixture will eventually cease to foam. Once the resin is degassed, it is poured into the mold, and the mold stored in an upright position at the cure temperature. Once the cure has completed, the mold is carefully separated. The resulting carboxylate-alumoxane/epoxy hybrid material can then be removed from the mold.

Figure 13:
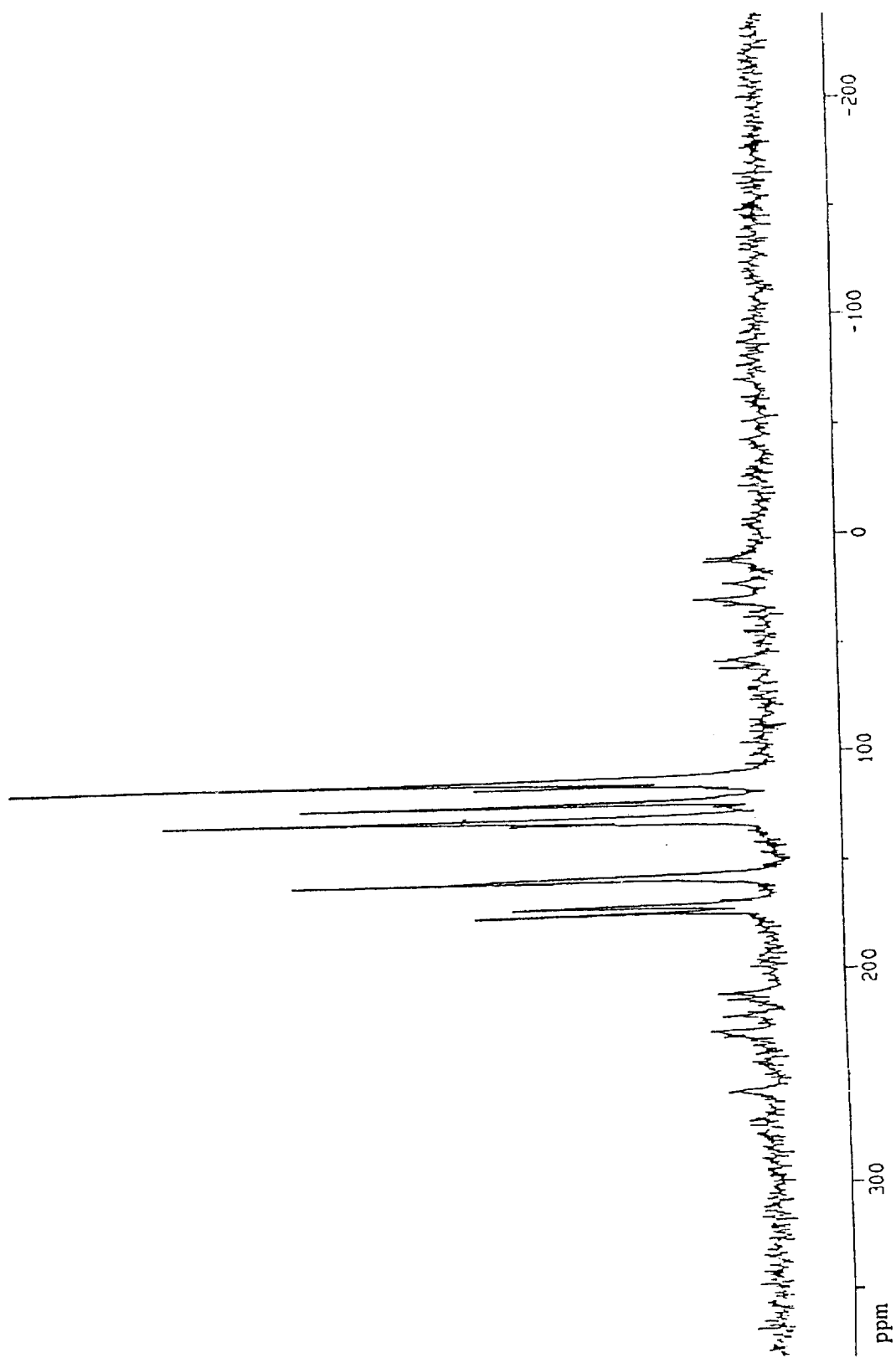
FIG. 13 is a $^{13}C$ CP/MAS NMR spectrum for 4-hydroxybenzoate-alumoxane.
Figure 14:
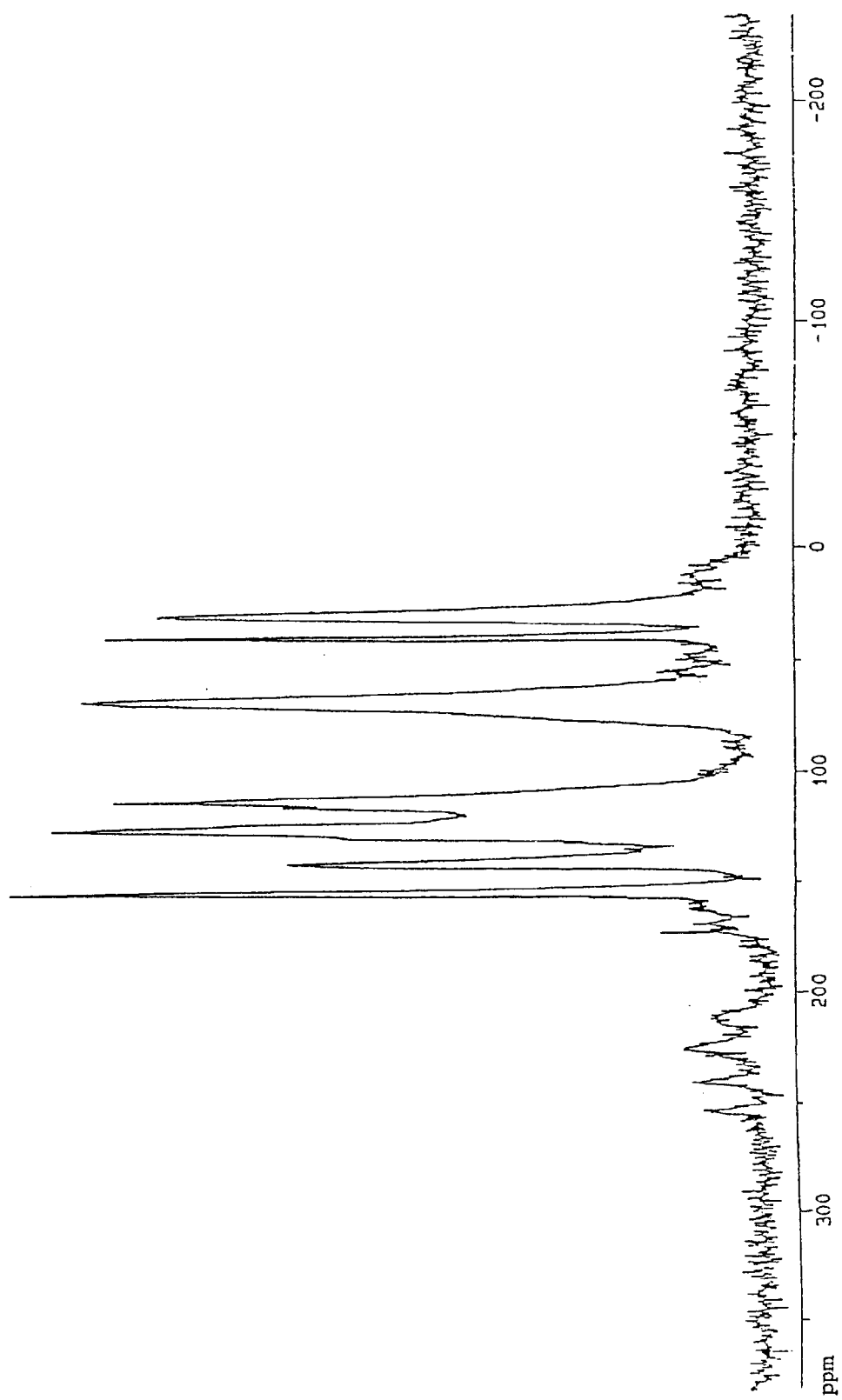
FIG. 14 is a $^{13}C$ CP/MAS NMR spectrum for 4-hydroxybenzoate-alumoxane epoxide resin prepared from a 1:2 weight ratio of alumoxane with Dow DER 332 resin.
Figure 15:
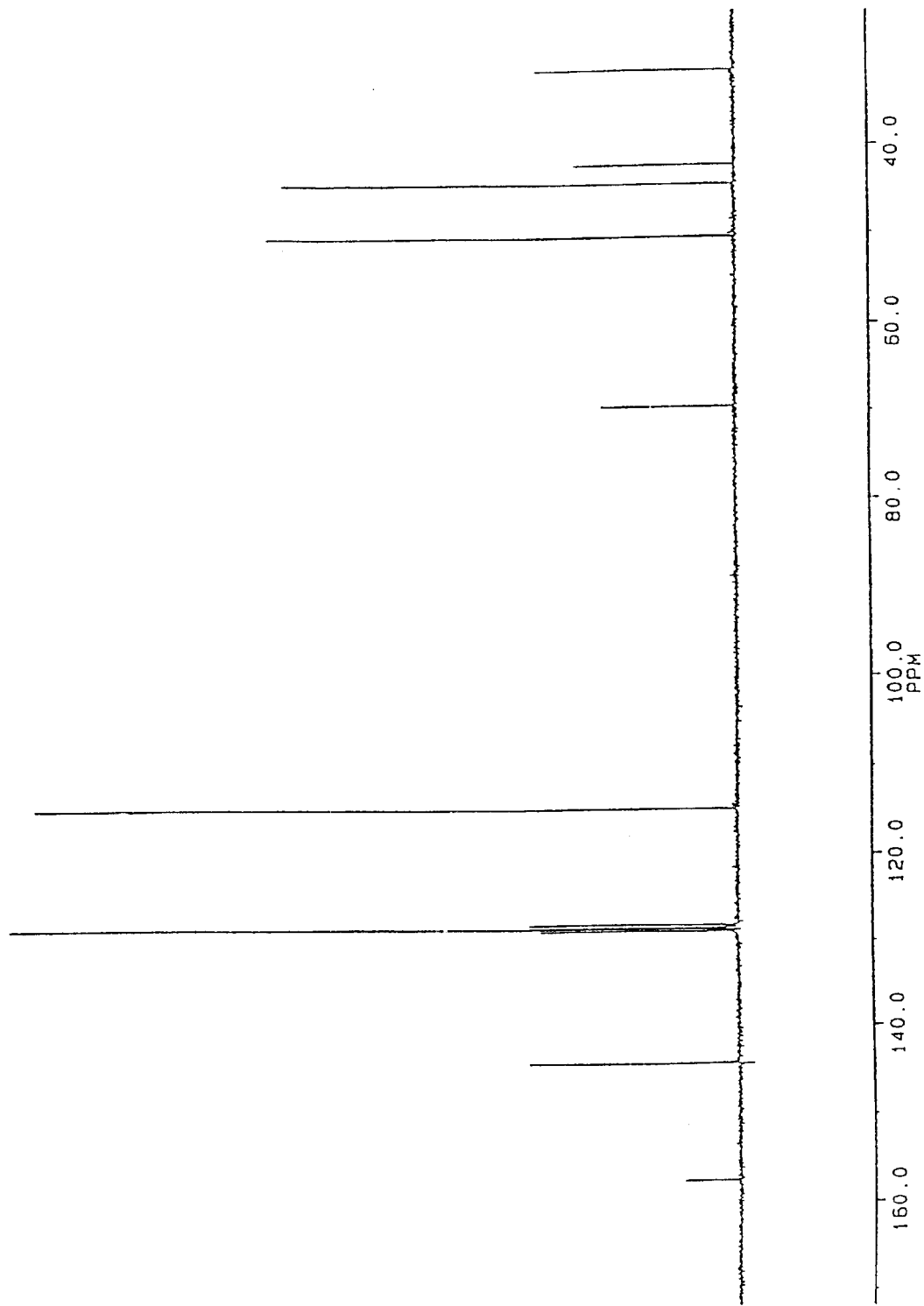
FIG. 15 is a $^{13}C$ NMR spectrum of the Dow DER 332 resin.

Solid state NMR characterization of the carboxylate-alumoxane/epoxide hybrid materials enables optimization of the reaction between the carboxylate-alumoxane's substituents and the epoxide groups. FIG. 13 shows the $^{13}C$ CP/MAS NMR spectrum for 4-hydroxybenzoate-alumoxane showing the presence of at least two magnetically distinct benzoate groups. FIG. 14 shows the $^{13}C$ CP/MAS NMR spectrum for 4-hydroxybenzoate-alumoxane epoxide resin prepared from a 1:2 weight ratio of the alumoxane with Dow DER 332 resin. The solution $^{13}C$ NMR spectrum of the Dow DER 332 resin is shown in FIG. 15. A comparison indicates that the signals due to the epoxide carbons of the resin are no longer present in the alumoxane-resin. This suggests that all the epoxide has reacted.

Figure 16:
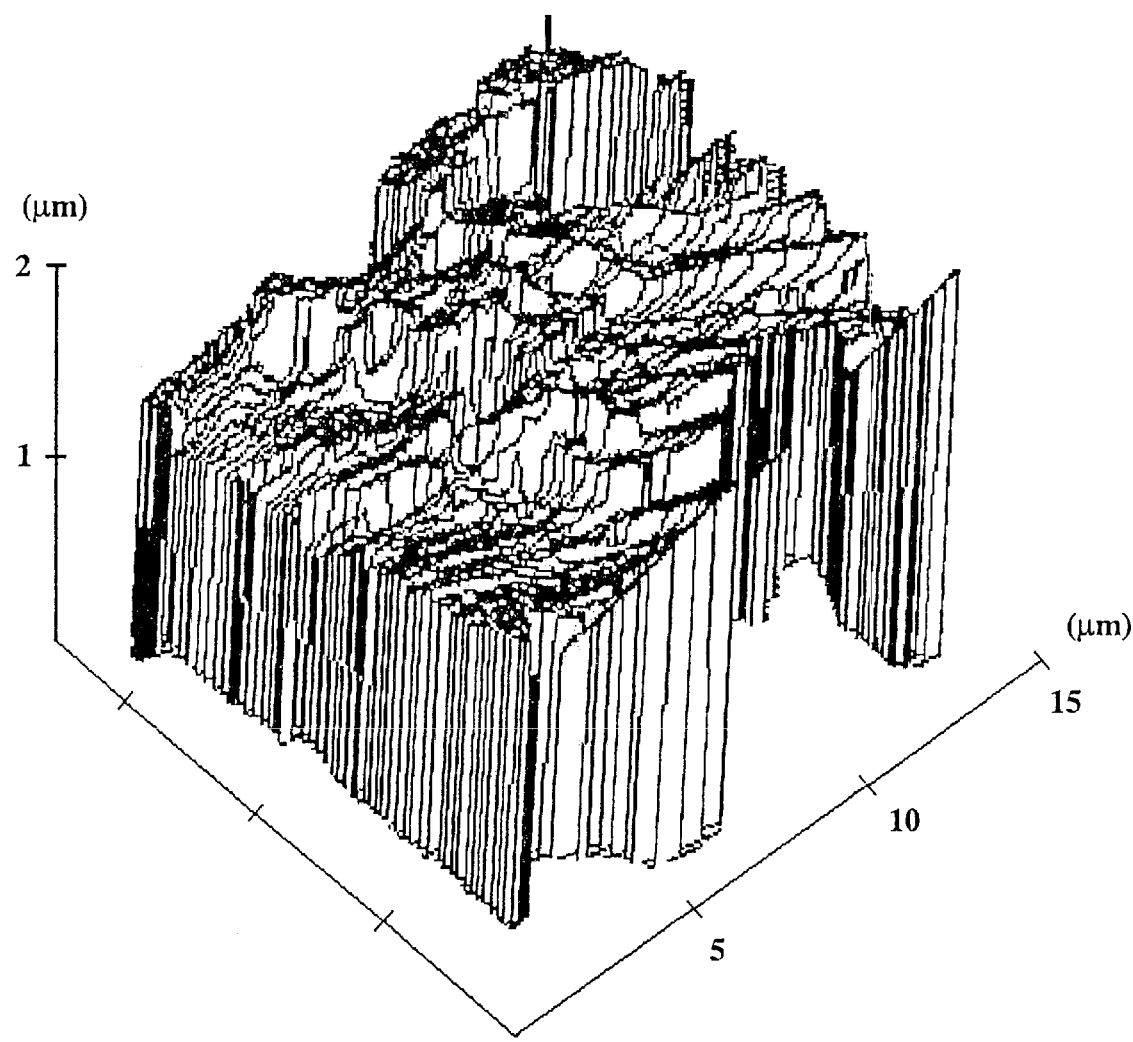
FIG. 16 is an AFM image of lysine-alumoxane hybrid resin.
Figure 17:
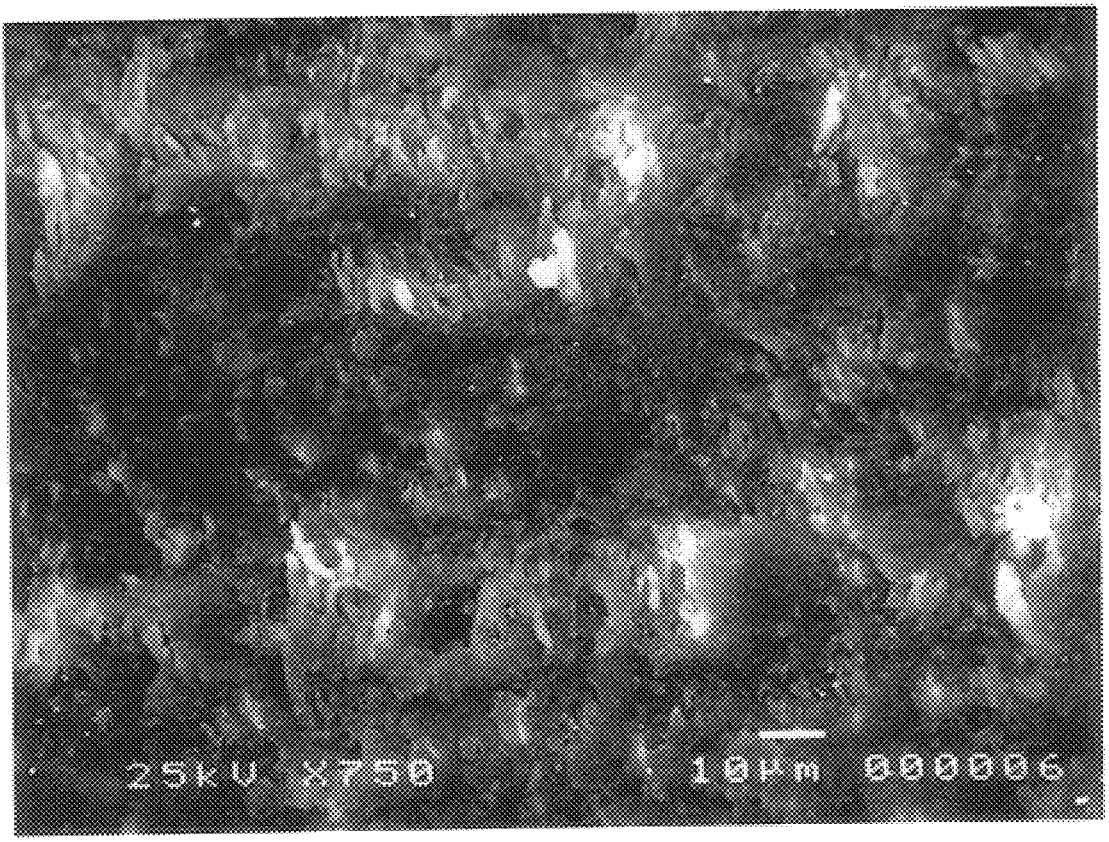
FIG. 17 is an SEI micrograph of lysine-alumoxane hybrid resin.

FIG. 16 is an AFM image of lysine-alumoxane hybrid resin showing the uniform distribution of the carboxylate-alumoxane throughout the material. Similarly, the SEI micrograph in FIG. 17 is of lysine-alumoxane hybrid resin showing the uniform distribution of the carboxylate-alumoxane throughout the material.

Carboxylate-alumoxane/epoxy composite materials can be prepared through the reaction of an amine and a hydroxyl functionalized carboxylate-alumoxane with a commercially available epoxy resin system, or through the reaction of an amine and a hydroxyl functionalized alumoxane with commercially available epoxy resin components in the presence of an organic cross-linking agent (e.g., ethylenediamine). The composite resins are prepared from a mixture of the appropriate carboxylate-alumoxane with a commercial resin system, such as Resin Services HTR-212 resin. Alternatively, composite resins may also be prepared from a mixture of the appropriate carboxylate-alumoxane with a commercial epoxide and an organic cross-linking agent such as ethylenediamine ($H_2NCH_2CH_2NH_2$).

Since it is desired that incorporation of the carboxylate-alumoxanes into the polymer matrix through covalent bonding will lead to improvement in the properties of the carboxylate-alumoxane/polymer composite, we illustrate the improvement of some of the properties of carboxylate-alumoxane/epoxy polymer composites. The improvements in the properties do not imply that these are the maximum or optimal improvements that could be obtained or that incorporation of carboxylate-alumoxanes into the polymers is limited to the properties illustrated.

Figure 18:
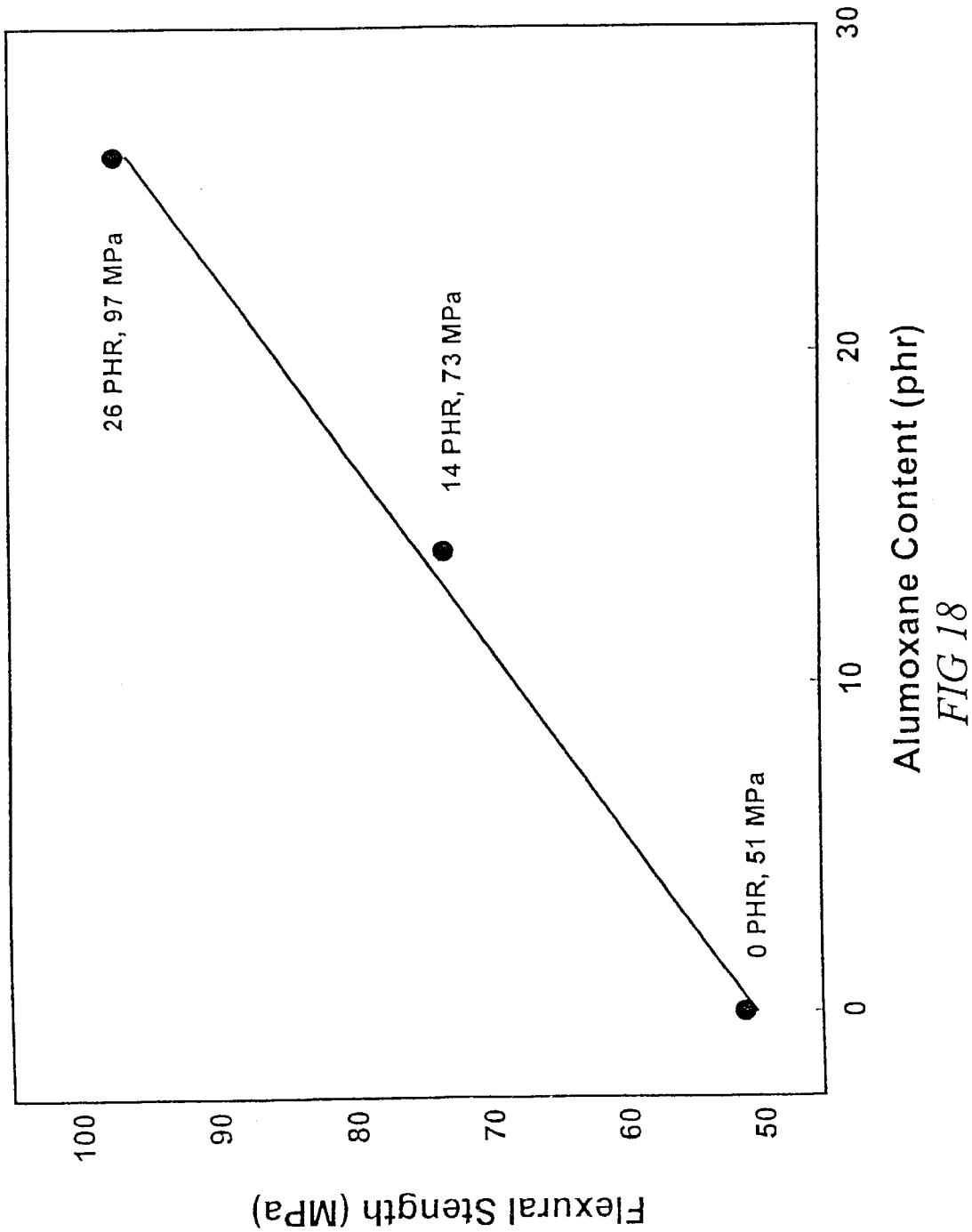
FIG. 18 shows a plot of flexural strength versus carboxylate-alumoxane loading for carboxylate-alumoxane/epoxy materials.

Carboxylate-alumoxane/epoxy composite materials containing a range of carboxylate-alumoxane to polymer precursor ratios were prepared using 4-hydroxybenzoate-alumoxane (HBA), Dow Chemical's DER 332 epoxy resin and Tone 0305 (a triol from Union Carbide). Resins were prepared using the ratios shown in Table 1. The various formulations were then cured and machined into test shapes. Rectangular bars of each epoxy formulation (with approximate dimensions of 0.125×0.125×1.2 inches) were machined and then subjected to a three point bend test to determine the flexural strength of the materials. The alumoxane-epoxy composites demonstrated better performance than the alumoxane-free epoxy resin. FIG. 18 shows a plot of flexural strength versus carboxylate-alumoxane loading for an carboxylate-alumoxane/epoxy materials. The alumoxane-free epoxy (Example 30) alone had a strength of 51 MPa, the triol plus 14 phr HBA (Example 31) had a strength of 73 MPa and the 26 phr HBA-alumoxane cured epoxy (no triol, Example 32) had a flexural strength of 97 MPa. These results indicate that the strength of the epoxy increases by almost 90% with the introduction of 26% (w/w) of the alumoxane.

The dimensional stability of the alumoxane-epoxy composites was also compared to the alumoxane-free epoxies. The results of the dimensional stability studies indicate that the incorporation of the alumoxanes into the epoxy polymer matrix improves the dimensional stability of the epoxy matrix. Up to 300° C., the 4-HBA-alumoxane-epoxy composite material distorts by less than 1%, while the alumoxane-free epoxy distorts by more than 2% at temperatures less than 100° C. and by more than 5% at temperatures up to 300° C. Clearly, the incorporation of the HBA-alumoxane into the polymer matrix results in a material with very good dimensional stability.

Phenol-formaldehyde (phenolic) resins are the most widely used of the thermosetting resins. The primary use of phenolic resins is as an adhesive in the manufacture of plywood. Phenolic resins are condensation products between phenol (or resorcinol) and formaldehyde. Phenolic-alumoxane polymer composites were prepared by reacting 4-hydroxybenzoate-alumoxane with an excess of formaldehyde in an aqueous solution. The reaction was carried out in water using sodium carbonate as the base catalyst. A hard solid material was produced by heating the mixture to temperatures between 90 and 100° C. To those skilled in the art, fabrication of alumoxane phenolics could also be prepared through the reaction of dihydroxybenzoate-alumoxanes and formaldehyde.

Figure 19:
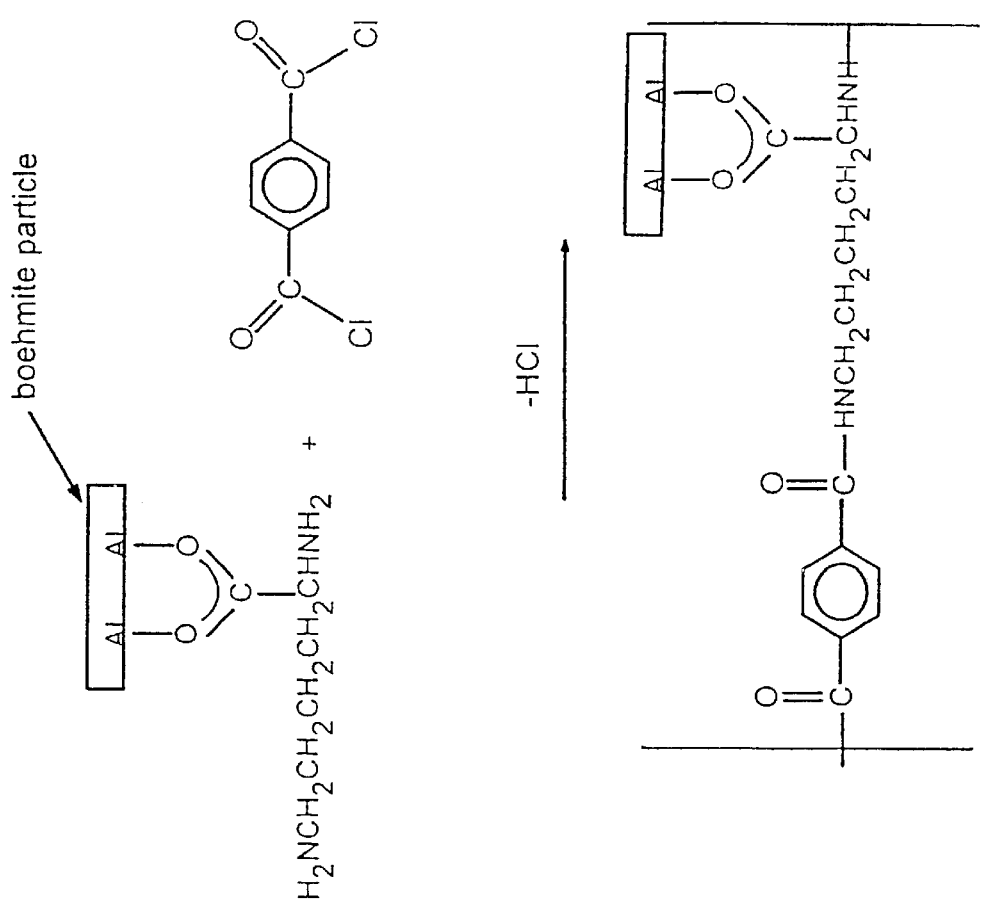
FIG. 19 is a simplified schematic of the reaction chemistry between an alumoxane and an acid dichloride.

Polyamides (or nylons) were among the first synthetic high polymers to be made and used on a large scale. There are four principal methods used in the synthesis of polyamides. These methods include: 1) the reaction between a dicarboxylic acid and a diamine; 2) the dehydration condensation of an amino acid; 3) the reaction between an acid dichloride and a diamine; 4) the ring opening polymerization of cyclic amides. To demonstrate that an alumoxane-polyamide composite could be formed we chose to use the reaction between an amine containing alumoxane (2,6-diaminohexanato-alumoxane) and an acid dichloride (phthaloyl chloride). The 2,6-diaminohexanato-alumoxane was dispersed into water and phthaloyl chloride in dichloromethane was added carefully to the aqueous solution. At the interface between the water and the dichloromethane a rubbery material was formed by the reaction of the amine functionalized alumoxane and the phthaloyl chloride. FIG. 19 shows a simplified schematic of the reaction chemistry between the alumoxane and the acid dichloride to form the polyamide.

Figure 20:
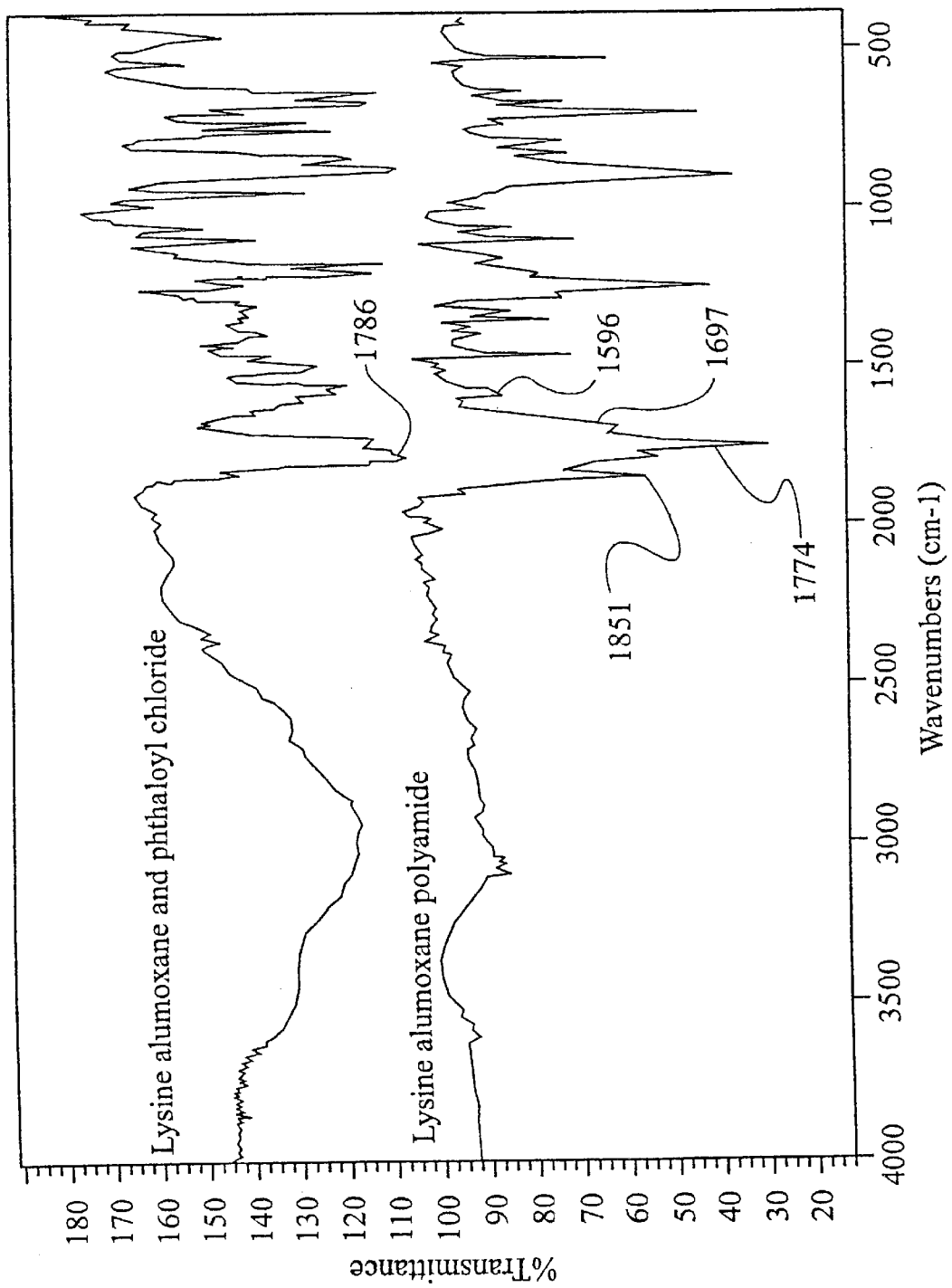
FIG. 20 is an FTIR showing the conversion of an acid chloride to an amide, as evidenced by the disappearance of the absorbance at 1789 $cm^{-1}$ and the appearance of the amide I band at 1689 $cm^{-1}$.

The progression of the reaction may be followed by FTIR and as is shown in FIG. 20. The conversion of the acid chloride to the amide was evidenced by the disappearance of the absorbance at 1789 cm$^{-1}$ (the acid chloride carbonyl) and the appearance of the amide I band at 1689 cm$^{-1}$. Although the preparation of an aliphatic polyamide was demonstrated, those skilled in the art will recognize that aromatic polyamide carboxylate-alumoxanes can be prepared by the reaction of the phthaloyl chloride with a carboxylate-alumoxane containing an aromatic amine. Thus reaction of 4-aminobenzenate-alumoxane with phthaloyl chloride would result in the formation of a carboxylate-alumoxane/ aromatic polyamide composite. Furthermore, the reaction between any amine (primary or secondary) functionalized carboxylate-alumoxanes and any dicarboxylic acid or acid dichloride will result in the formation of carboxylate-alumoxane/polyamide hybrid and composite materials.

Figure 21:
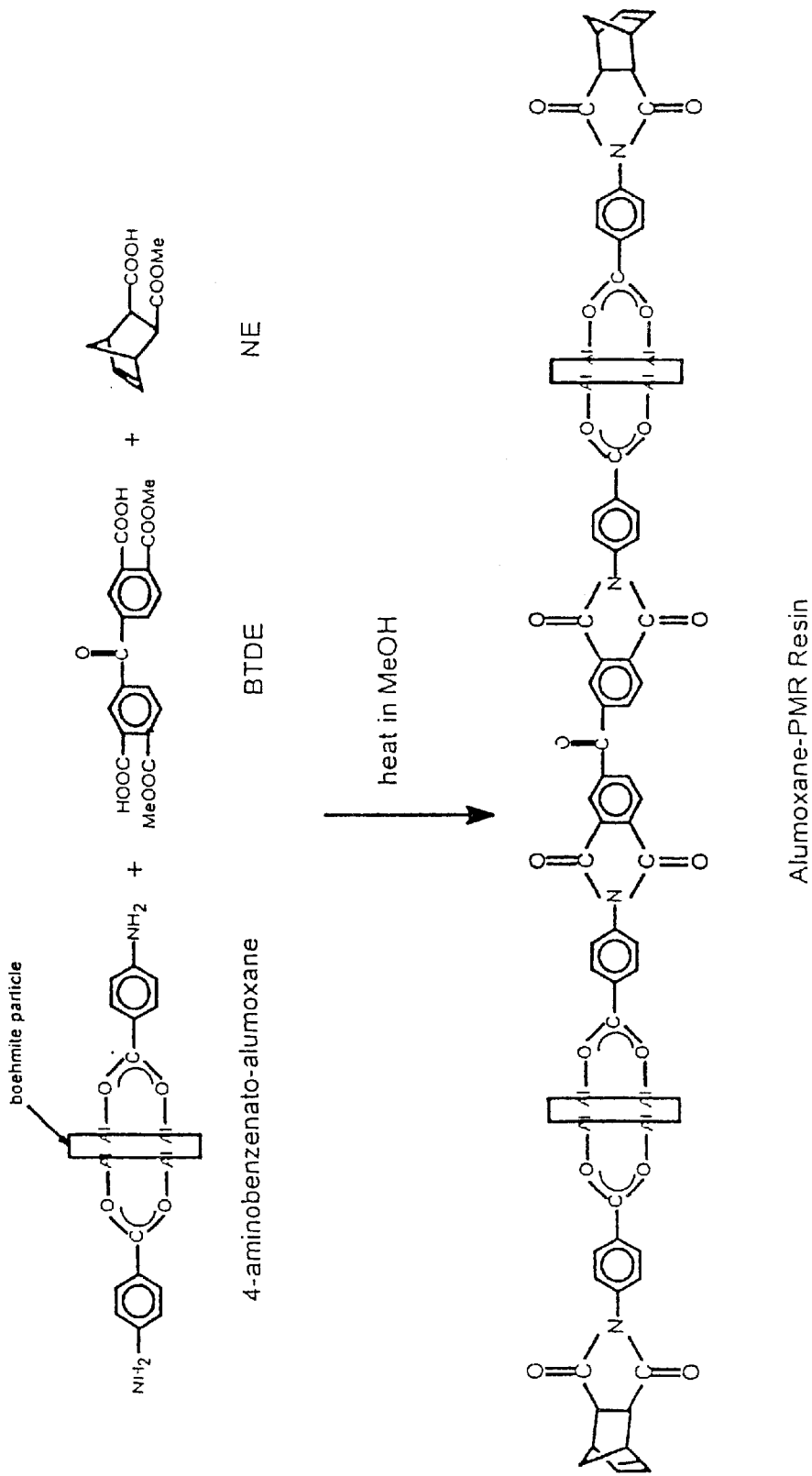
FIG. 21 shows the reaction components used to form a polyimide designated PMR-15.

Polyimides are polymers formed by condensation reactions between dianhydrides and diamines. Polyimides represent an important class of high-temperature, solvent-resistant polymers. Typical uses for polyimides include electronics, sleeve bearings, valve seatings and as the matrix component of graphite composites used in numerous aerospace applications. The first preparative step involves condensation of an aromatic dianhydride and an aromatic diamine to form an intermediate poly(amic acid). Dehydration of the poly(amic acid) at higher temperatures leads to the formation of the polyimide structure. FIG. 21 shows the reaction components used to form a polyimide designated PMR-15. Using a synthetic approach that is similar to the preparation that is used to synthesize PMR-15 we have prepared a carboxylate-alumoxane polyimide. The carboxylate-alumoxane polyimide was prepared by the reaction of 4 -aminobenzanoate-alumoxane with BTDE and NE. To a solution of the 4-aminobenzenoate-alumoxane in methanol was added a solution of BTDE in methanol and heated to reflux for an hour. NE in methanol was then added to the mixture and the methanol was then removed from the mixture. The resulting powder was heated to 320° C. using a four step temperature ramp. The formation of the alumoxane polyamide was verified by observation of FTIR absorptions at 1785 cm$^{-1}$ and 1710 cm$^{-1}$ that show the presence of the imide bond. To those skilled in the art, the preparation of carboxylate-alumoxane polyimides would also be possible by reaction of any aromatic amine functionalized carboxylate-alumoxane and the appropriate aromatic dianhydride.

Figure 22:
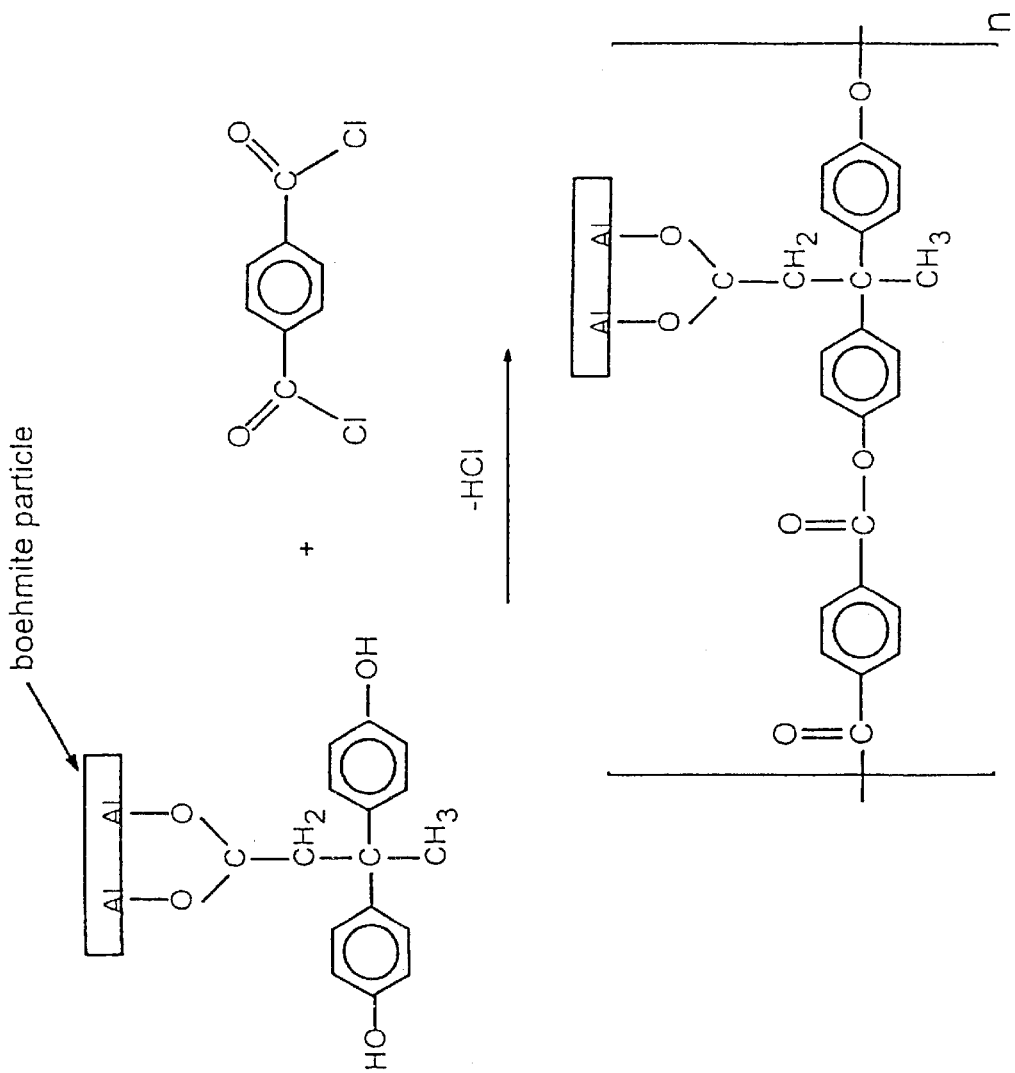
FIG. 22 shows the preparation of a carboxylate-alumoxane polyester carried out by reaction of a diphenolate-alumoxane with phthaloyl chloride.

Thermosetting polyesters are widely used in the fabrication of moldings, laminate or reinforced structures, surface gel coatings, liquid castings and furniture. Polyesters are prepared by the condensation of diols with dicarboxylic acids. The polyesters can also be formed by the reaction of diols with derivatives of carboxylic acids such as methyl esters and acid dichlorides. The preparation of a carboxylate-alumoxane polyester was carried out by reaction of a diphenolate-alumoxane with phthaloyl chloride as shown in FIG. 22. In this reaction diphenolic acid alumoxane and sodium hydroxide were dispersed into distilled water and the sodium salt of benzene sulfonic acid in water was added to the mixture with stirring. Phthaloyl chloride was then added with vigorous stirring. After approximately 15 minutes, the solution became cloudy, and was added to cold acetone. The resulting precipitate was washed several times with cold water. Formation of the carboxylate-alumoxane polyester was shown by the appearance of the ester peak absorption at 1744 cm$^{-1}$ in the product of the reaction between the diphenolato-alumoxane and the phthaloyl chloride. The formation carboxylate-alumoxane polyesters is not limited to the two reagents described above. The carboxylate-alumoxane polyesters can also be prepared using a dicarboxylic acid or the methyl ester of a carboxylic acid and any hydroxyl functionalized carboxylate-alumoxane.

Polycarbonates are a class of polyesters derived from carbonic acid $(HO)_2C=O$ (i.e., $[ROC(O)O]^{2-}$). The most widely synthesized and use polycarbonates are those prepared by the reaction of bisphenol A with either organic carbonate or phosgene gas. The widespread use of polycarbonate is due to its good balance of properties, such as high clarity, toughness, high heat deflection temperatures and dimensional stability. Polycarbonate carboxylate-alumoxane was prepared from the reaction of diphenylcarbonate with 4-hydroxybenzoate-alumoxane. These two materials (and a base catalyst) were slowly heated in a heat taped, thick-walled glass tube under a dynamic vacuum. As the reaction proceeded, a liquid was collected in the cold trap protecting the vacuum pump. This material was identified by FTIR to be the phenol byproduct produced from the reaction of diphenylcarbonate and the 4-hydroxybenzoate-alumoxane. After additional heating, the reaction mixture was cooled and the resulting product was characterized by FTIR spectroscopy. The FTIR spectra showed the presence of C—O stretching bands at 1225 cm$^{-1}$ and a strong C=O stretching band at 1775 cm$^{-1}$. The alumoxane polycarbonate can also be prepared by the reaction of hydroxybenzoate-alumoxanes with phosgene gas or organic carbonates other than phenyl carbonate.

Polyurethanes are a class of materials that are prepared by the reaction of bischloroformates or diisocyanates with diols. Polyurethanes are widely used as elastic fibers, foams, and coatings. Carboxylate-alumoxane polyurethanes were prepared by the reaction of methylene bis-(4,4'-phenelene diisocyanate) (MDI) with hydroxyl functionalized carboxylate-alumoxanes. The reaction of either diphenolate-alumoxane or dimethylolpropionato-alumoxane with DMI resulted in the formation of a polyurethane containing a covalently bonded carboxylate-alumoxane. To prepare the alumoxane-polyurethane MDI was dissolved in methyl isobutyl ketone (MIBK). A separate suspension of dimethylolpropionate-alumoxane mixed with dimethyl sulfoxide was prepared and the slurry added to the MDI solution. The mixture was heated to reflux until the formation of the polyurethane was achieved. The formation of the carboxylate-alumoxane/polyurethane polymer composite was followed by FTIR. As formation of the carboxylate-alumoxane/polyurethane progressed, the disappearance of the isocyanate absorption at 2262 cm$^{-1}$ was observed. Alumoxane-polyurethanes can also be prepared by the reaction of any hydroxyl functionalized carboxylate-alumoxane with any diisocyanate or through the reaction of any amine functionalized carboxylate-alumoxane with bisdichloroformate.

Figure 23:
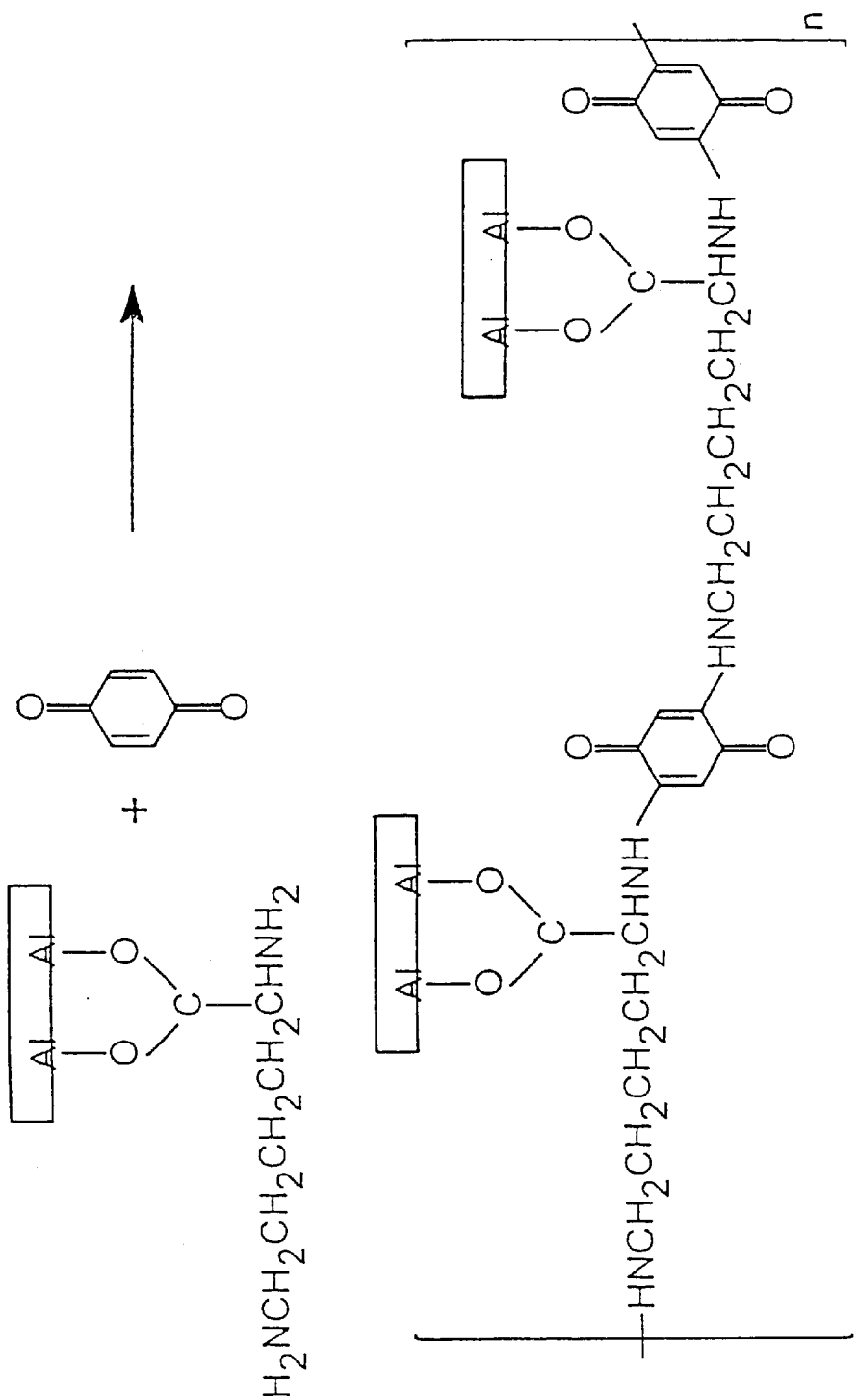
FIG. 23 shows a simplified reaction schematic of the reaction between an amine functionalized alumoxane and benzoquinone.

Quinone amine polymers are prepared by a condensation reaction of diamines with quinones. Quinone amine polymers have been shown to adhere to metals and to displace water from metal surfaces and have thus been investigated as coatings. Quinone-amine carboxylate-alumoxane polymer composites have been prepared by the condensation reaction between benzoquinone and amine functionalized carboxylate-alumoxanes. To prepare the quinone-amine carboxylate-alumoxanes, 2,6-diaminohexanoate-alumoxane in ethanol was added to a mixture of benzoquinone in ethanol and heated at reflux for 4 hours. Most of the ethanol was then removed under reduced pressure with the resulting slurry dropped in cold water to precipitate the quinone-amine carboxylate-alumoxane polymer composite. The progress of the condensation reaction was followed by FTIR. The FTIR spectrum shows the change of absorption from a primary amine (1585 cm$^{-1}$) to a secondary amine (1465 cm$^{-1}$) as the condensation reaction proceeded. FIG. 23 shows a simplified reaction schematic of the reaction between an amine functionalized alumoxane and benzoquinone. Quinone-amine carboxylate-alumoxane composites can be prepared by the reaction of any aliphatic amine functionalized carboxylate-alumoxane with benzoquinone.

Although it is desirable for the interaction of the carboxylate-alumoxane with the polymer matrix to be based upon covalent bonding, other chemical bonding interactions are also possible. Hydrogen bonding, acid-base interactions and charge transfer interactions are alternatives. As an example, an aqueous solution of urea was heated with 4-hydroxybenzoate-alumoxane. The resulting pale yellow, creamy smooth liquid was poured in a mold and heated at 90° C. to form a hard solid. Those skilled in the art would recognize that carboxylate-alumoxane/polymer material could also be prepared by the reaction of any hydroxyl or amino functionalized carboxylate-alumoxane with any suitable hydrogen bonding molecule or polymer.

A major class of thermoplastics are the polyacrylics and polyolefins. Unlike the materials discussed above, these are ordinarily prepared via addition polymerization rather than condensation polymerization. Polyacrylic carboxylate-alumoxane polymer composites have been prepared by the addition reaction between methylmethacrylate and methacylic acid functionalized alumoxanes. Alternatively, methacrylate-alumoxane and benzoyl chloride may be reacted in the presence of methacrylic acid to produce a brittle white solid. The FTIR spectrum of the washed polymer shows the absorption of the methacrylic acid carbonyl at 1697 cm$^{-1}$ and the alumoxane at 1589 cm$^{-1}$. The peak at 1633 cm$^{-1}$ and 1648 cm$^{-1}$ due to the monomer double bond absorption has disappeared in the polymer spectrum.

Applications for the carboxylate-alumoxane derived resins include, but are not limited to, those where improvement of physical properties are required as compared to standard all-organic resins. The carboxylate-alumoxane derived resins have increased hardness and toughness. The carboxylate-alumoxanes are presumed to inhibit crack propagation through crack bridging. The carboxylate-alumoxane resins can be used to improve the abrasion- and scratch-resistance of resins. The presence of the carboxylate-alumoxane has been demonstrated to reduce cure time and cure temperature. The carboxylate-alumoxane resins have desirable barrier properties, including an electrical resistance of $10^{10}$ Ω. The carboxylate-alumoxane resins also may have desirable optical properties compared to the purely organic resins, including: controllable refractive index and fluorescence. The magnetic properties of the resins may be varied by the doping of the alumoxane as shown by Kareiva et al. (1996).

The preceding discussions illustrate the nature of the invention, i.e., synthesis of carboxylate-alumoxane/polymer composites by the reaction of functionalized carboxylate-alumoxanes with low molecular weight polymer precursors containing reactive functional groups. These reactions lead to incorporation of the carboxylate-alumoxanes into the polymer matrix though covalent bonding between the carboxylate-alumoxane and the polymer. Carboxylate-alumoxane polymer materials that can be prepared by reaction of the carboxylate-alumoxane with polymer precursors include without limitation: epoxies, phenol-formaldehyde resins, polyamides, polyesters, polyimides, polycarbonates, polyurethanes and quinone-amine polymers. Similarly, alumoxanes incorporating additional metals (metal-exchanged alumoxanes) can replace the alumoxanes of the present invention.

EXAMPLES

The following examples are presented to illustrate the ease and versatility of the approach and are not to be construed as in any way limiting the scope of the invention. The first fourteen Examples illustrate the synthesis of alumoxanes having various functional groups. The balance of the Examples illustrate the synthesis of compounds comprising various precursors cross-linked with variously functionalized alumoxanes.

Example 1

Nano-sized boehmite was prepared by hydrolysis of aluminum tris(sec-butoxide) at 90° C. A typical procedure uses 500 grams of aluminum tris(sec-butoxide) hydrolysed in 3.2 liters of water. The particle size of the boehmite is 40–70 nm. Water is removed by evaporation to give a 10 w.% solution of boehmite.

Example 2

A 1:1 mixture of boehmite (10 g) and 4-hydroxybenzoic acid (23 g) were refluxed overnight in 200 ml of water. The reacted solid was filtered and washed with ethanol, ether, and finally air-dried. This reaction yielded 4-hydroxybenzonate-alumoxane.

Example 3

Boehmite (180 g) dispersed in 2 L of distilled water was mixed with 4-hydroxybenzoic acid (276 g) and heated to 90° C. overnight. The mixture was then cooled to room temperature and the water removed under vacuum using a rotary evaporator. This reaction yielded 4-hydroxybenzonate-alumoxane.

Example 4

Boehmite (180g) dispersed in 2 L of distilled water was mixed with 4-aminobenzoic acid (274 g) and heated to 90° C. overnight. The mixture was then cooled to room temperature and the water removed under vacuum using a rotary evaporator. This reaction yielded 4-aminobenzonate-alumoxane.

Example 5

Boehmite (180 g) dispersed in 2 L of distilled water was mixed with 6-aminonhexanoic acid (262 g) and heated to 90° C. overnight. The mixture was then cooled to room temperature and the water removed under vacuum using a rotary evaporator.

Example 6

A 1:1 mixture of lysine (25 g) and boehmite (10 g) were refluxed overnight in 200 ml of water. The mixture was then filtered to remove any unreacted boehmite. The solution was then pumped dry. The resulting solid lysine-alumoxane was air-dried.

Example 7

Boehmite (180 g) dispersed in 2 L of distilled water was mixed with lysine hydrochloride (356 g). The pH was adjusted to 4 using nitric acid and the mixture was heated to 90° C. overnight. The mixture was then cooled to room temperature and the water removed under vacuum using a rotary evaporator.

Example 8

Boehmite (180 g) dispersed in 2 L of distilled water was mixed with an 85% aqueous solution of lactic acid (212 g) and heated to 90° C. overnight. The mixture was then cooled to room temperature and the water removed under vacuum using a rotary evaporator.

Example 9

Boehmite (180 g) dispersed in 2 L of distilled water was mixed with an 70% aqueous solution of hydroxyacetic acid (217 g) and heated to 90° C. overnight. The mixture was then cooled to room temperature and the water removed under vacuum using a rotary evaporator.

Example 10

Boehmite (180 g) dispersed in 2 L of distilled water was mixed with aminoacetic acid (150 g) and heated to 90° C. overnight. The mixture was then cooled to room temperature and the water removed under vacuum using a rotary evaporator.

Example 11

Boehmite (180 g) dispersed in 2 L of distilled water was mixed with an 85% aqueous solution of 2,2-bis (hydroxymethyl)propionic acid (268 g) and heated to 90° C. overnight. The mixture was then cooled to room temperature and the water removed under vacuum using a rotary evaporator.

Example 12

Boehmite (180 g) dispersed in 2 L of distilled water was mixed with an 85% aqueous solution of 2,2-bis (hydroxyphenyl)valeric acid (572 g) and heated to 90° C. overnight. The mixture was then cooled to room temperature and the water removed under vacuum using a rotary evaporator.

Example 13

A suspension of boehmite and methacrylic acid (1:4 ratio) was heated to reflux in xylene for 72 hours. The solution was filtered and the volatile compounds removed under vacuum. The resulting solid was washed with ethanol and $Et_2O$.

Example 14

In a 5L round bottom flask boehmite (40 g) and methacrylic acid (57.4 g) were added to 1.500 L distilled water and refluxed for 2 days. The powder formed was dried and washed with 600 ml hexane to remove unreacted methacrylic acid. The mixture was filtered and dried to give a very fine white powder. The FTIR spectrum indicated that absorption of the acid carbonyl at 1697 $cm^{-1}$ was replaced by the alumoxane absorption at 1583 $cm^{-1}$. Additionally, the double bond in the methacrylic acid was conjugated with the acid and was at 1633 $cm^{-1}$, whereas the same bond in the alumoxane was not conjugated and found at the higher frequency of 1648 $cm^{-1}$, confirming the conversion of an acrylic vinyl group to a non-conjugated system.

Example 15

DOW DER 332 DGEBPA epoxy resin (3 g) was heated to 40° C. to liquefy the resin and then 4-hydroxybenzonate-alumoxane (2 g) such as was produced in Examples 2 and 3 was added and the two components were thoroughly mixed. Then 0.025 g of 1-methylimidazol was added to the mixture as a catalyst. The sample was maintained at a temperature between 35–45° C. during this process. The mixture was then transferred to an aluminum mold and heated to 140° C. for 6 hours. The material cures to a hard state that can be sanded. The cured alumoxane-containing resin was not scratched by copper or nickel coins and was only slightly scratched by a hardened steel knife edge. The FTIR spectra showed the expected formation of methylene groups in the cured resin.

Example 16

Into DOW DER 332 DGEBPA epoxy resin, a 5% load of 4-hydroxybenzoate-alumoxane was added along with Ancamine 1693 (an Air Products curing agent). The resin mixture was poured into a mold and heated to 150° C. for 2 hours.

Example 17

4-hydroxybenzoate-alumoxane (2.8 g) was ground to a fine powder in a porcelain mortar. DOW DER 332 Epoxy Resin (4.2 g) was warmed to 40–45° C. in a 5 ml glass vial. The 4-hydroxybenzoate-alumoxane powder was added to the resin and the mixture stirred for 30 min. A 0.1 ml aliquot of 1-methylimidazole was added and worked up over an additional 5 min. The vial was brought into an oil bath and heated at 130–140° C. for 2 hr. to yield a cream-yellow colored ceramic block.

Example 18

A 1:1 mass ratio mixture of 4-hydroxybenzoate-alumoxane and DOW DER 332 Epoxy Resin was heated along with 0.1 ml of 1-methylimidazole for 2 hours at 100° C. to give a pinkish-white solid.

Example 19

A 1:5 mass ratio mixture of 4-hydroxybenzoate-alumoxane and DOW DER 332 Epoxy Resin was poured into a flat mold and heated along with 0.1 ml of 1-methylimidazole for 2 hours at 100° C. The molded material had a red color.

Example 20

A 1:3 mass ratio mixture of 4-hydroxybenzoate-alumoxane and DER 332 was poured into a small glass vial and heated along with 0.1 ml of 1-methylimidazole for 2 hours at 100° C. The molded material had a deep red color.

Example 21

4-hydroxybenzoate-Alumoxane (0.5 g) was suspended in acetonitrile (5 ml) and added to an excess amount of 1,2-epoxy-3-phenoxypropane (1.0 g). The suspension was refluxed for five days under atmospheric pressure. The solid part was isolated by filtration and washed with acetonitrile (2×2 ml).

Example 22

Resin Services Resin HTR-212 was used in combination with Resin Services Hardener #874 and a suitable carboxylate-alumoxane. The optimal ratio of epoxide:alumoxane:hardener had previously been found to 5:2:1 (by mass). Heating the composites for approximately 12 hours at 40° C. facilitated the cure. For example, while stirring, 2.02 g of diphenolate-alumoxane and 30 ml of 1-methylimidazole were slowly added to the resin. The mixture was heated under reflux for five hours at 80° C. To 1.70 g of the diphenolato-alumoxane diglycidyl ether solution 1.8 g of tris-(2-aminoethyl)amine, $(NH_2CH_2CH_2)_3N$, curing agent was then added and the mixture was heated for 30 minutes. Removal of the solvent and curing 110° C. for six hours produced a hard, homogeneous alumoxane-epoxy polymer composite.

Example 23

A 2:1 mole ratio mixture of lysine-alumoxane (lysine=$H_2N(CH_2)_4CH(NH_2)CO_2H$) and DOW DER 332 was combined in a vial along with 1-methylimidazole (0.1 ml). The alumoxanes were also dissolved in a minimum amount of water to better distribute the alumoxanes throughout the resin/hardener mixture. The cured materials were a light-yellow in color, and "bumpy" in texture. These resins proved to be flexible and transparent when thinly coated on paper.

Example 24

DOW DER 332 epoxy resin (1.85 g) was dissolved in 50 ml of dimethoxyethane. While stirring, 1.20 g of dimethylolpropionato-alumoxane and 30 ml of 1-methylimidazole were slowly added The mixture was heated under reflux for five hours at 80° C. To 1.50 g of the dimethylolpropionato-alumoxane diglycidyl ether solution 1.6 g of tris-(2-aminoethyl)amine, $(NH_2CH_2CH_2)_3N$, curing agent was then added and the mixture was heated for 30 minutes. Removal of the solvent and curing 110° C. for six hours produced a hard homogeneous alumoxane-epoxy polymer composite.

Example 25

Into DOW DER 332 epoxy resin, a 5% load of methoxy (ethoxyethoxy)acetate-alumoxane was added along with Ancamine 1693 curing agent. The resin mixture was poured into a mold and cured at 150° C. for 2 hours to yield a solid.

Example 26

Into DOW DER 332 epoxy resin, a 5% load of hexanoate-alumoxane was added along with Ancamine 1693 curing agent. The resin mixture was poured into a mold and cured at 150° C. for 2 hours to yield a solid.

Example 27

Gluconate-alumoxane (0.5 g) was added to a 1:5 mass ratio mixture of DOW DER 332 epoxy resin and hardener and allowed 24 hours to cure without heating. The resultant solid was yellow in color, tacky to the touch, and relatively brittle.

Example 28

Acetate-alumoxane (0.5 g) was added to a 1:5 mass ratio mixture of DOW DER 332 epoxy resin and hardener and allowed 24 hours to cure with heating (50° C.). The resultant solid was yellow in color, less tacky to the touch than the unheated sample, and similarly brittle.

Example 29

A carboxylate-alumoxane free epoxy was prepared by mixing 100 g of Dow DER 332 epoxy resin with 50 g of Tone 0305 (Union Carbide). To this mixture was also added 0.5 g of methylimidazole and the mixture was poured into a mold and heated at 50° C. overnight. Flexural tests on machined 0.125"×0.125×"1.2" test specimens using a three point bend test gave an average flexural strength of 51 MPa

Example 30

A carboxylate-alumoxane/epoxy (14 PHR alumoxane) was prepared by mixing 100 g Dow DER 332 epoxy resin, 50 g Tone 0305 Resin and 25 grams of 4-hydroxybenzenato-alumoxane along with 0.5 g of methylimidazole. The mixture was poured into a mold and heated overnight at 50° C. Flexural tests on machined 0.125"×0.125"×1.2" test specimens using a three point bend test gave an average flexural strength of 73 MPa.

Example 31

A carboxylate-alumoxane epoxy (26 PHR alumoxane) was prepared by adding 35 grams of 4-hydroxybenzenato-alumoxane to 100 grams of Dow DER 332 epoxy resin along with 0.5 grams of 1-methylimidazole. The mixture was then poured into a mold and heated overnight at 50° C. Flexural tests on machined 0.125"×0.125"×1.2" test specimens using a three point bend test gave an average flexural strength of 97 MPa.

Example 32

To a solution of 1.9 g of a cycloaliphatic epoxy resin (Union Carbide ERL 4221) in methanol was added 1.0 g dimethylolpropionato-alumoxane and 30ml of 1-methylimidazole and the mixture was heated for an hour at 70–80° C. To the heated solution 0.45 amine equivalents of tris-(2-aminoethyl)amine, $(NH_2CH_2CH_2)_3N$, curing agent was then added and the mixture was heated for 45 minutes. Removal of the solvent and curing at 90° C. for six hours produced a hard homogeneous alumoxane-epoxy polymer composite.

Example 33

The alumoxane-epoxy polymer composite was prepared by the reaction of 4-hydroxybenzenato-alumoxane and water soluble epoxy resin and cure agents (i.e., EPI-REZ 5522-WY-55 resin and EPI-CURE 8290 respectively). The waterborne alumoxane-epoxy resin system was prepared as a two part primer formulation. The 4-hydroxybenzenato-alumoxanes were thoroughly mixed with the EPI-REZ 5522 resin along with a defoamer, dispersants, and pigments in water (Part A). The EPI-CURE 8290 was also mixed with water (Part B). The two parts are then mixed for 30 minutes at 1200 rpm before being placed in a mold and cured at 50° C. for approximately 12 hours to give a hard solid alumoxane-epoxy polymer composite.

Example 34

The alumoxane-epoxy polymer composite was prepared by the reaction of water soluble 2,6-diaminohexanato-alumoxane and water soluble epoxy resin and cure agents (i.e. EPI-REZ 5522-WY-55 resin and EPI-CURE 8290 respectively). The waterborne alumoxane-epoxy resin system was are prepared as two part primer formulations. The soluble 2,6-diaminohexanato-alumoxane are thoroughly mixed with the EPI-REZ 5522 resin along with a defoamer, dispersants, and pigments in water (Part A). The EPI-CURE 8290 was also mixed with water (Part B). The two parts are then mixed for 30 min. at 1200 rpm before being placed in a mold and cured at 50° C. for 10 to 12 hours to give a hard solid alumoxane-epoxy polymer composite.

Example 35

4-hydroxybenzoate-alumoxane (9.6 g) was suspended in xylene (100 ml) and added by epichlorohydrine (45 g) and an aqueous solution (20 ml) of KOH (18 g, 321 mmol). This mixed solvent suspension was refluxed at ca. 140° C. and allowed water to distill off naturally over ca. 30 min. The suspension gradually obtained pale yellow tint and the reflux was discontinued after 3 hr. The product was dried under vacuum to yield a highly viscous product.

Example 36

Acetate-alumoxane (0.5 g) was first dissolved in a small amount of water and then added to a 1:5 mass ratio mixture of Resin Services HTR-212 resin and hardener #874 and allowed 24 hours to cure with heating (50° C.). The resultant solid was yellow in color, slightly tacky to the touch.

Example 37

Gluconic-alumoxane (0.5 g) was added to a 1:5 mass ratio mixture of Resin Services HTR-212 resin and hardener #874 and allowed 72 hours to cure at 50° C. The resultant solid was brown in color.

Example 38

Gluconic-alumoxane (0.5 g) was dissolved in a minimal amount of water and added to a 1:5 mass ratio mixture of Resin Services HTR-212 resin and hardener #874 and allowed 72 hours to cure at 50° C. The resultant solid was yellow in color, very brittle.

Example 39

Di-amylphosphate-alumoxane (0.5 g) was added to a 1:5 mass ratio mixture of Resin Services HTR-212 resin and hardner #874 and allowed 72 hours to cure at 50° C. The resultant solid was red-brown in color, possessed hairline cracks throughout, and was relatively brittle.

Example 40

The alumoxane polyamide composite resin was prepared by adding 6-diaminohexanoate-alumoxane (1.0 g) to 3.0 ml distilled water to give a cloudy mixture which was then carefully added to a stirred solution of phthaloyl chloride (0.7 g) in 5 ml methylene chloride. The white rubbery material formed at the interface was periodically removed and placed in water. At the end of 10 minutes the reactants were discarded and the white rubbery material washed with water several times. It was found to be insoluble in water, slightly soluble in methylene chloride and soluble in warm acetone. The reaction was monitored by FTIR; the conversion of the acid chloride to the amide was indicated by the disappearance of absorbance at 1789 $cm^{-1}$ of the acid chloride carbonyl and the appearance of the amide I band at 1689 $cm^{-1}$.

Example 41

To prepare the alumoxane-quinone-amine polymer composite 2.70 g of the 2,6-diaminohexanato-alumoxane in 12 ml of ethanol was added to a mixture of 1.62 g benzoquinone in 10 ml ethanol. The mixture was heated to reflux for 4 hours. Most of the ethanol was then removed under reduced pressure and the remaining slurry dropped in cold water for precipitation. The FTIR spectrum of the resulting product showed a change of absorption from the primary amine (i.e. the 2,6-diaminohexanato-alumoxane amines) at 1585 $cm^{-1}$ to the secondary amines (i.e. the alumoxane-quinone-amine polymer) at 1465 $cm^{-1}$ as the reaction proceeded

Example 42

To prepare the alumoxane-polyurethane polymer composite, methylene diphenyl isocyanate (MDI) (25.0 g) was first dissolved in 40 ml methyl isobutyl ketone. Dimethylolpropionato-alumoxane (5.02 g) was dissolved in 30 ml acetonitrile and then the acetonitrile solution was added to the MDI containing methyl isobutyl ketone solution. Tin octoate was used as a catalyst at 1% (w/w) concentrations to accelerate the reaction between the alumoxane and the isocynate. The mixture was allowed to reflux for 4 hours at 80° C., and then left at room temperature overnight prior to separation of the products from the reaction mixture. As formation of the alumoxane-polyurethane progressed the disappearance of the isocyanate absorption at 2262 $cm^{-1}$ was observed.

Example 43

To prepare the alumoxane-polyester polymer composite diphenolato-alumoxane (2.6 g) was first dissolved along with 0.40 g sodium hydroxide in 30 ml water. A surfactant solution prepared by the addition of 0.3 g of the sodium salt of benzene sulfonic acid in 3 ml water was added to the alumoxane containing solution and the mixture stirred well. Phthaloyl chloride solution (1.02 g in 15 ml toluene) was then added with vigorous stirring. After 15 minutes, the solution became cloudy, and was dropped into 50 ml cold acetone. The precipitate was washed several times with cold water. The reaction was monitored by FTIR; the preparation of the polyester was followed by the appearance of the ester peak absorption at 1744 $cm^{-1}$.

Example 44

The alumoxane-polyimide polymer composite was prepared by first preparing sock solutions of BTDE and NE. The BTDE stock solution was prepared by addition of 6.72 g (20 mmol) BTDA (3,3',4,4'-benzophenone tetracarboxylic acid) to 20.0 ml of methanol followed by a one hour reflux. The solution a clear yellow, indicating the presence of the diester (BTDE). In a similar manner NE was prepared by the esterification of 2.67 ml (3.29 g) norbornene anhydride (NA) in 10 ml of methanol. To a solution of 2.0 g 4-aminobenzenato-alumoxane in 2.0 ml methanol was added 5.8 ml of the BTDE stock solution. The mixture was heated for an hour under reflux, and then 2.7 ml NE stock solution was added. The mixture was poured into an aluminum mold. Some of the methanol was boiled off on a hot plate with stirring. The alumoxane-polyimide precursor mixture was then heated according to the schedule: 70° C. for one hour, 100° C. for one hour, 240° C. for one hour and then 320° C. for eight hours. The heat cure resulted in the formation of a head tough polyimide solid. FTIR was used to follow the imidization reaction. Confirmation of the imidization reaction was obtained from the FTIR spectrum of the resin products. The appearance of absorption at 1785 $cm^{-1}$ and 1710 $cm^{-1}$ signals the formation of the imide.

Example 45

An aqueous solution (10 ml) of urea (0.5 g, 8.3 mmol) was added by 4-hydroxybenzoate-alumoxane (1.0 g, 3.9 mmol)

and refluxed for 4 hr. The resulted pale yellow creamy smooth liquid was poured in a mold and heated to 90° C. The water was allowed to evaporate naturally. Beige tinted porous ceramic pieces were obtained.

Example 46

A 1:1 (w/w) mixture of poly(vinyl alcohol) was refluxed overnight with MEEA-alumoxane dissolved in water. No precipitate formed and the water was removed in vaccuo to yield a transparent film which was washed with ether and dried.

Example 47

A 1:1 (w/w) mixture of 4-hydroxybenzoic alumoxane was stirred for several hours with MEEA-alumoxane dissolved in water. The mixture was then poured onto a fluoroware lid and allowed to evaporate to dryness. A thick white, glassy, film was obtained.

Example 48

A 1:1 (w/w) mixture of sebacic acid was stirred for several hours with MEEA-alumoxane dissolved in water. The mixture was then poured onto a fluoroware lid and allowed to evaporate to dryness. A thick white, powdery, film was obtained.

Example 49

DOW DER 332 DGEBPA epoxy resin (3 g) was heated to 40° C. to liquefy the resin and then 4-hydroxybenzonate-alumoxane (2 g) was added and the two components were thoroughly mixed. Then 0.025 g of 1-methylimidazol was added to the mixture as a catalyst. The sample was maintained at a temperature between 35–45° C. during this process. The mixture was then transferred to an aluminum mold containing carbon fiber tows (Fortafil 3) and heated to 140° C. for 6 hours. The SEM images of the cured carbon fiber alumoxane-hybrid resin composite shows that the fiber tows are completely infiltrated.

Example 50

DOW DER 332 DGEBPA epoxy resin (3 g) was heated to 40° C. to liquefy the resin and then 4-hydroxybenzonate-alumoxane (2 g) was added and the two components were thoroughly mixed. Then 0.025 g of 1-methylimidazol was added to the mixture as a catalyst. The sample was maintained at a temperature between 35–45° C. during this process. The mixture was then transferred to an aluminum mold containing Kevlar™ fiber tows (Fortafil 3) and heated to 140° C. for 6 hours. The SEM images of the cured carbon fiber alumoxane-hybrid resin composite shows that the fiber tows are completely infiltrated.

TABLE 1

| Example | Amount of Dow Chemical's DER 332 epoxy resin (g) | Amount of hydroxybenzoate-alumoxane (g) | Amount of Tone 0305 triol (g) | Flexural Strength (MPa) |
|---|---|---|---|---|
| 29 | 100 | 0 | 50 | 51 |
| 30 | 100 | 25 | 50 | 73 |
| 31 | 100 | 35 | 0 | 97 |

What is claimed is:

1. A polymeric composition comprising a reaction product of a carboxylate-alumoxane and a reactive compound wherein said carboxylate-alumoxane comprises a chemically reactive substituent which reacts with the reactive compound to form the polymeric composition.

2. The composition according to claim 1, wherein said reactive compound comprises an alumoxane.

3. The composition according to claim 2 wherein said reactive compound is a different alumoxane from said chemically functionalized carboxylate-alumoxane.

4. The composition according to claim 1, wherein said chemically reactive substituent is selected from the group consisting of amines, hydroxyls, acrylics, vinyls and olefins.

5. The composition according to claim 1, wherein said reactive compound includes a functional group selected from the group consisting of isocyanates, aldehyde, diorgano-carbonates, oxiranes, acid chlorides, anhydrides, carboxylic acids, quinines, and olefins.

6. The composition according to claim 1, wherein said reactive compound comprises an organic polymer precursor.

7. The composition according to claim 1, wherein said reaction product comprises an inorganic polymer backbone.

8. The composition according to claim 1, further including a second reactive compound that reacts with at least one of said carboxylate-alumoxane and said reactive compound.

9. The composition according to claim 1, wherein said carboxylate-alumoxane includes at least one carboxylate group that does not react with said reactive compound.

10. The composition according to claim 1, wherein reaction between said carboxylate alumoxane and said reactive compound includes formation of a covalent chemical bond.

11. The composition to claim 1, wherein reaction between said carboxylate alumoxane and said reactive compound includes formation of a hydrogen bond.

12. The composition according to claim 1, wherein reaction between said carboxylate alumoxane and said reactive compound includes formation of an interaction between an acid and a base.

13. The composition according to claim 1, wherein reaction between said carboxylate alumoxane and said reactive compound includes formation of a charge transfer interaction.

14. The composition according to claim 1, wherein said reaction product includes a polymer backbone and said polymer backbone consists of carbon atoms.

15. The composition according to claim 1, wherein said reaction product includes a polymer backbone and said polymer backbone comprises carbon atoms and non-carbon atoms.

16. The composition according to claim 1, wherein said reaction product includes a polymer backbone and said polymer backbone includes silicon atoms.

17. The composition according to claim 1, wherein said reactive compound is inorganic.

18. A method for synthesizing a polymeric composition, comprising:
    (a) providing a carboxylate-alumoxane comprising a chemically reactive substituent;
    (b) providing a reactive compound; and
    (c) reacting said chemically reactive substituent with said reactive compound so as to link said carboxylate-alumoxane to said reactive compound to form a polymeric compound.

19. The method according to claim 18 wherein reactive compound provided in step (b) is selected from the group consisting of epoxies, phenol-formaldehyde resins, polyurethanes, polyamides, polyesters, polyimides, polycarbonates, quinone-amine polymers, polysulfones, and mixtures thereof.

20. The method according to claim 18 wherein the polymeric compound formed in step (c) comprises a thermoset polymer.

21. The method according to claim 18 wherein the reactive compound provided in step (b) is selected from the group consisting of acrylics, poly(vinyl acetate) and polyolefins.

22. The method according to claim 18 wherein step (c) involves an addition reaction.

23. The method according to claim 18 wherein step (c) involves a condensation reaction.

24. The method according to claim 18 wherein step (c) is carried out in the presence of a catalyst.

25. The method according to claim 24 wherein the catalyst is selected from the group consisting of tertiary amines, sodium carbonate, 1-methylimidazol and tin octoate.

26. The method according to claim 24 wherein the catalyst is 1-methylimidizole.

27. The method according to claim 24 wherein the catalytic reaction occurs due to photolysis.

28. The method according to claim 18 wherein step (c) is carried out in the presence of an inert solvent.

29. The method according to claim 18 wherein step (c) is carried out in bulk.

30. The method according to claim 18 wherein step (c) is carried out in suspension.

31. The method according to claim 18 wherein step (c) is carried out in emulsion.

32. The method according to claim 18 wherein the carboxylate-alumoxane is dissolved in the reactive compound.

33. The method according to claim 18 wherein the reactive compound is dissolved in the carboxylate-alumoxane.

34. The method according to claim 18 wherein step (c) is carried out at less than 400° C.

35. The method according to claim 18 wherein step (c) is carried out at less than 200° C.

36. A polymer comprising a first carboxylate-alumoxane functionalized with a first chemically reactive substituent and a second carboxylate-alumoxane functionalized with a second chemically reactive substituent, wherein said first and second carboxylate-alumoxanes are chemically bonded to each other.

37. The polymer according to claim 36 wherein said first and second chemically reactive substituents are the same.

38. The polymer according to claim 36 wherein said first and second chemically reactive substituents are different.

* * * * *

UNITED STATES PATENT AND TRADEMARK OFFICE
CERTIFICATE OF CORRECTION

PATENT NO.    : 6,369,183 B1
DATED         : April 9, 2002
INVENTOR(S)   : Ronald Lee Cook et al.

It is certified that error appears in the above-identified patent and that said Letters Patent is hereby corrected as shown below:

<u>Title page,</u>
Item [73] change Assignee, to read as follows:
-- Assignee:    Wm. Marsh Rice University
                TDA Research, Inc. --

Signed and Sealed this

Twenty-seventh Day of May, 2003

JAMES E. ROGAN
*Director of the United States Patent and Trademark Office*